Figure 1:
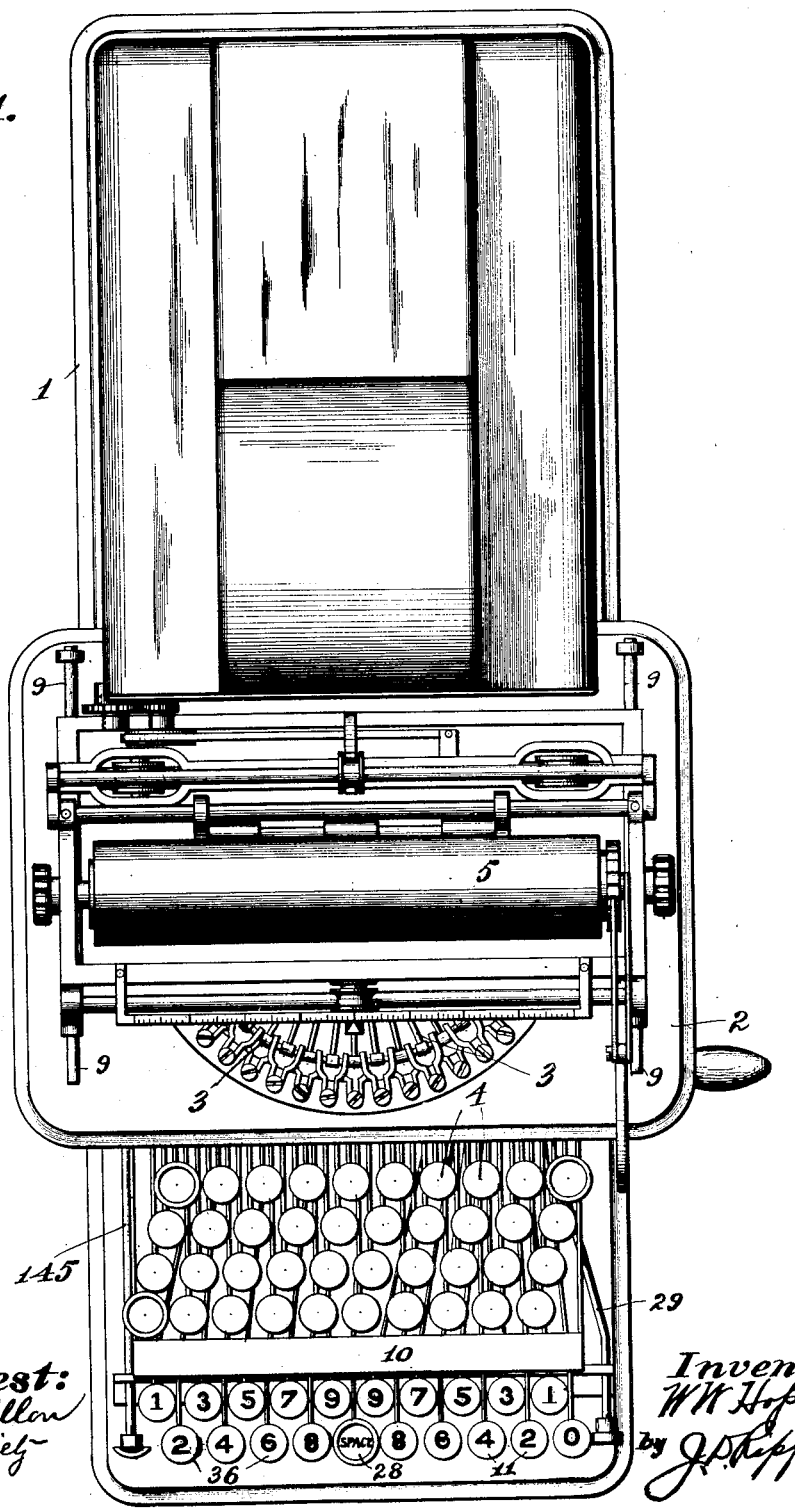

No. 844,519. PATENTED FEB. 19, 1907.
W. W. HOPKINS.
MULTIPLYING AND TYPE WRITING MACHINE.
APPLICATION FILED MAY 12, 1904.

17 SHEETS—SHEET 1.

Attest:
Edw. L. Dillon
G. W. O. Dietz

Inventor:
W. W. Hopkins
by J. P. Lippey
Att'y

No. 844,519. PATENTED FEB. 19, 1907.
W. W. HOPKINS.
MULTIPLYING AND TYPE WRITING MACHINE.
APPLICATION FILED MAY 12, 1904.
17 SHEETS—SHEET 4.

Attest:
Edw. L. Dillon
G. W. O. Dietz

Inventor:
W. W. Hopkins
by J. Rippey Att'y.

No. 844,519. PATENTED FEB. 19, 1907.
W. W. HOPKINS.
MULTIPLYING AND TYPE WRITING MACHINE.
APPLICATION FILED MAY 12, 1904.

17 SHEETS—SHEET 5.

Attest:
Edw. L. Dillon
G. W. O. Dietz

Inventor:
W W Hopkins
by J D Rippey
Att'y.

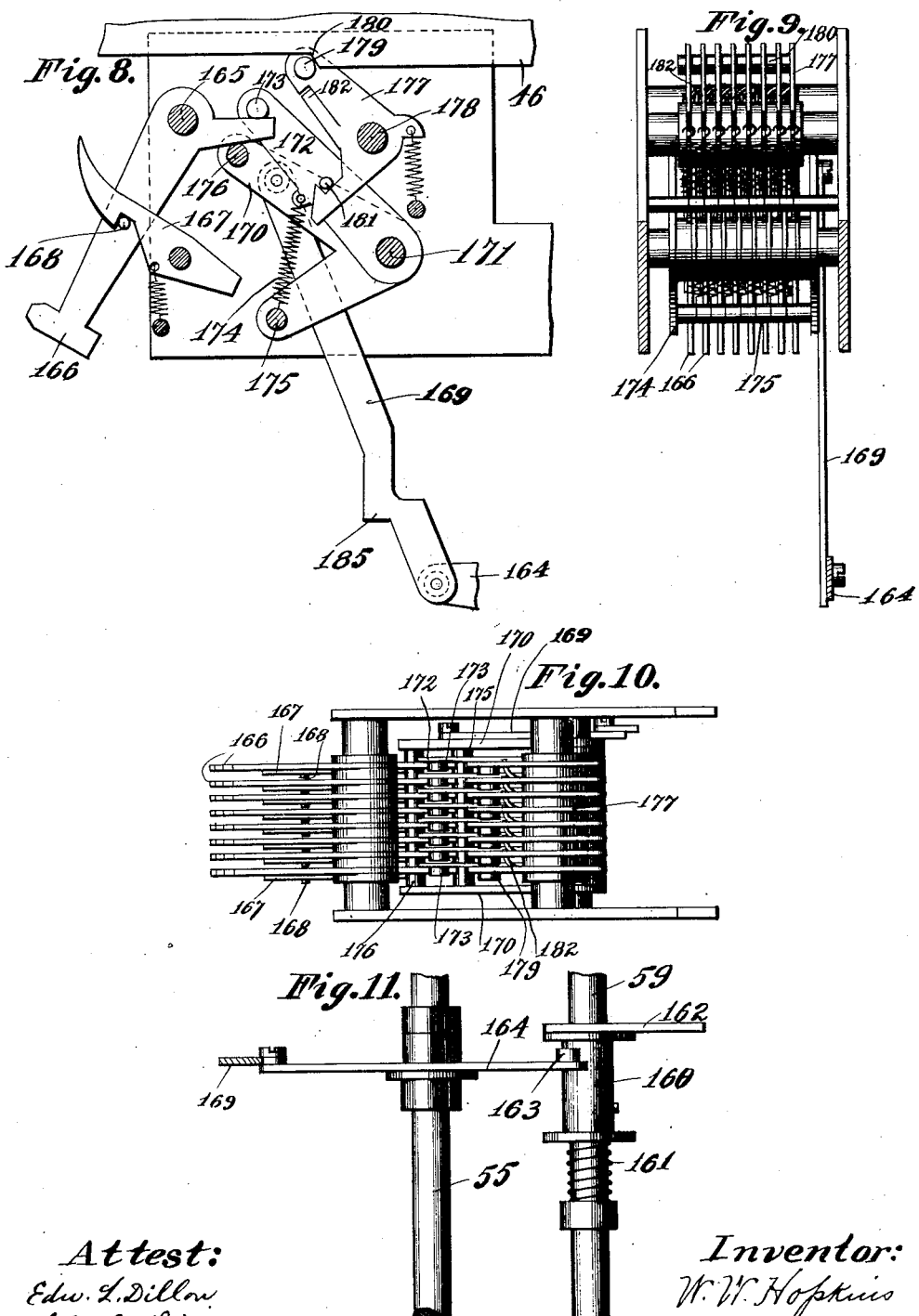

No. 844,519. PATENTED FEB. 19, 1907.
W. W. HOPKINS.
MULTIPLYING AND TYPE WRITING MACHINE.
APPLICATION FILED MAY 12, 1904.

17 SHEETS—SHEET 7.

Attest:
Edw. L. Dillon
G. W. O. Dietz

Inventor:
W. W. Hopkins
by J. D. Rippey
Att'y

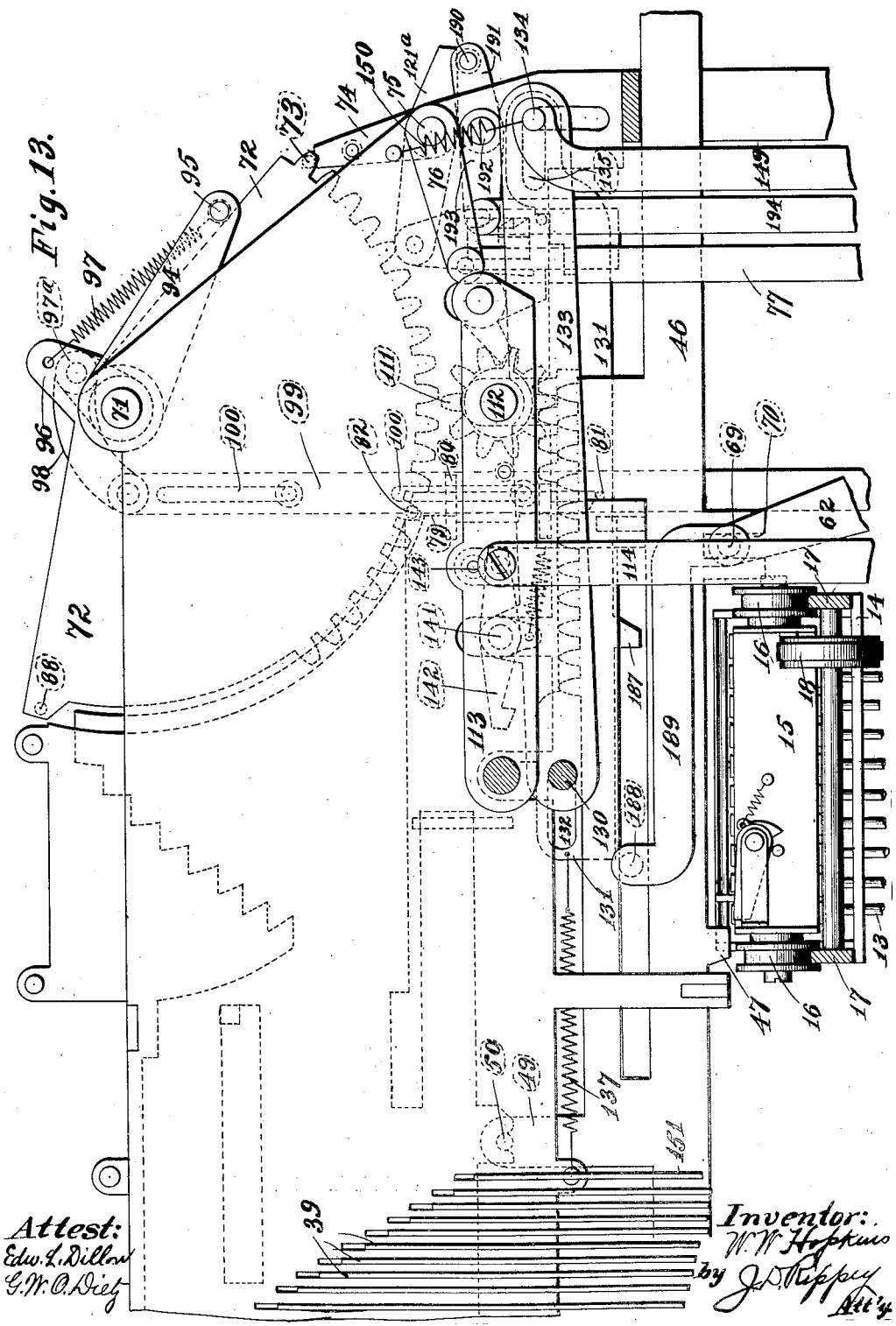

No. 844,519. PATENTED FEB. 19, 1907.
W. W. HOPKINS.
MULTIPLYING AND TYPE WRITING MACHINE.
APPLICATION FILED MAY 12, 1904.
17 SHEETS—SHEET 9.
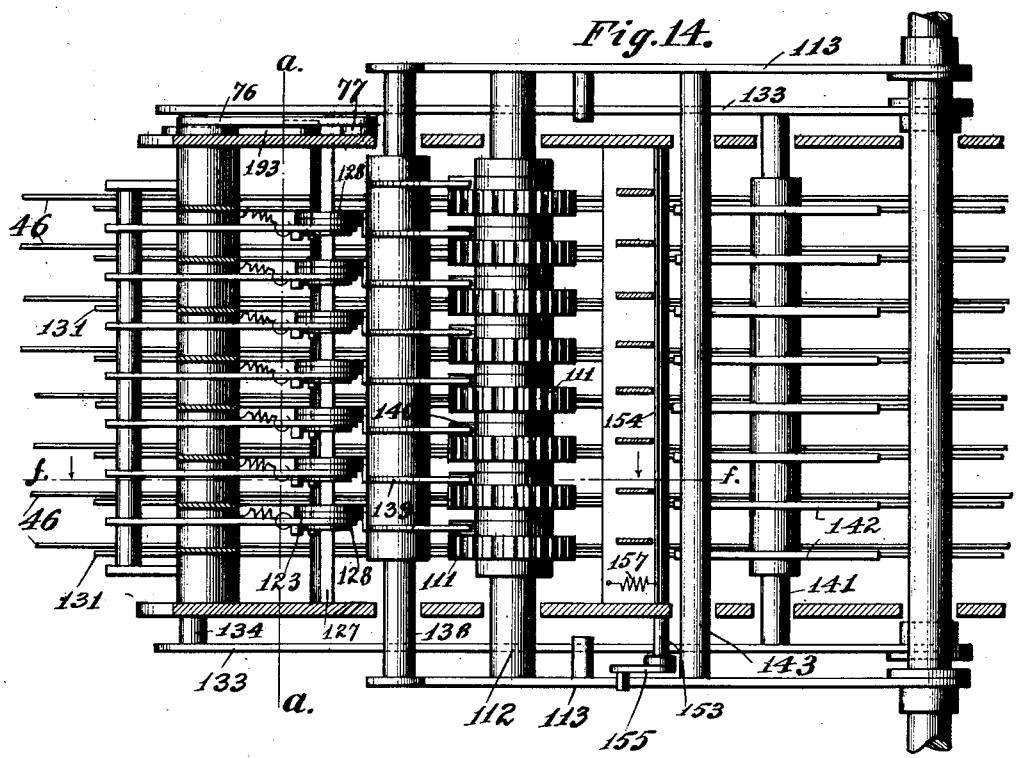
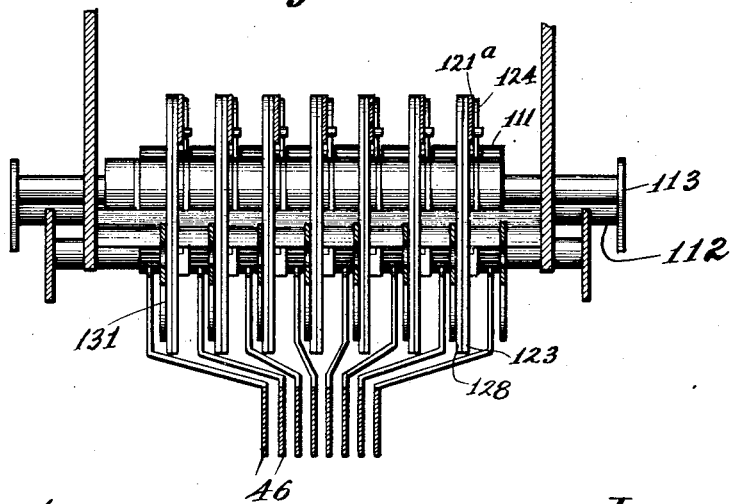
Attest:
Edw. L. Dillon
G. W. O. Dietz
Inventor:
W. W. Hopkins
by J. D. Rippey Att'y.

No. 844,519. PATENTED FEB. 19, 1907.
W. W. HOPKINS.
MULTIPLYING AND TYPE WRITING MACHINE.
APPLICATION FILED MAY 12, 1904.
17 SHEETS—SHEET 10.
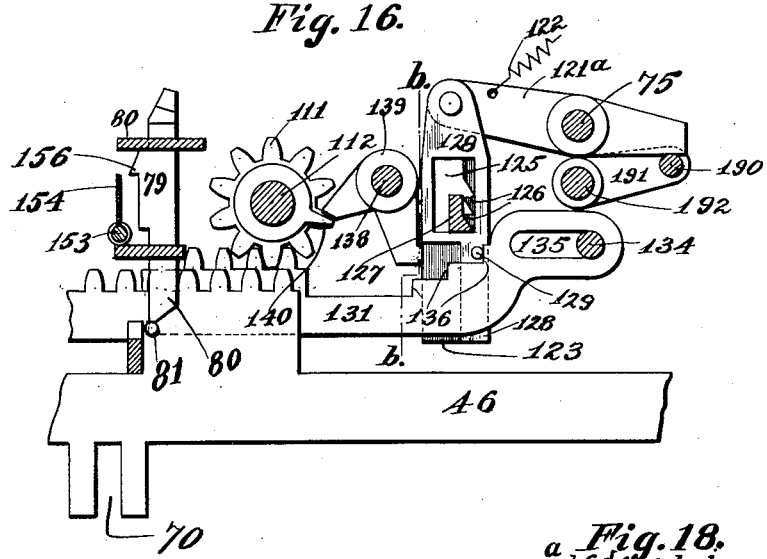
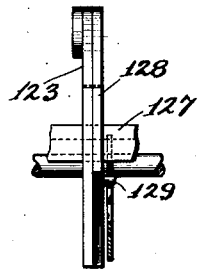
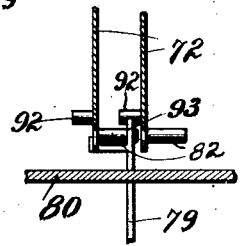
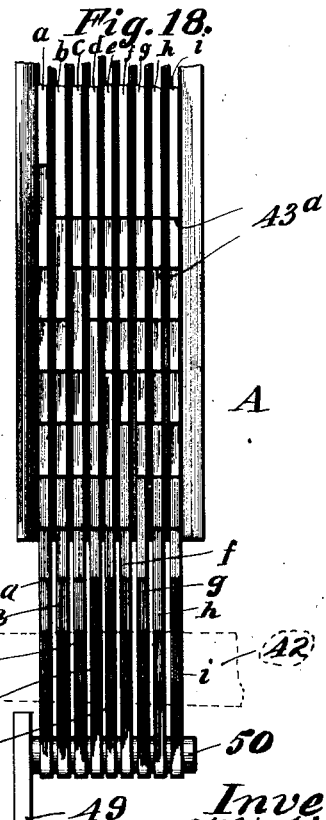
Attest:
Edw. L. Dillon
G. W. O. Dietz
Inventor:
W. W. Hopkins
by J. D. Rippey
Att'y.

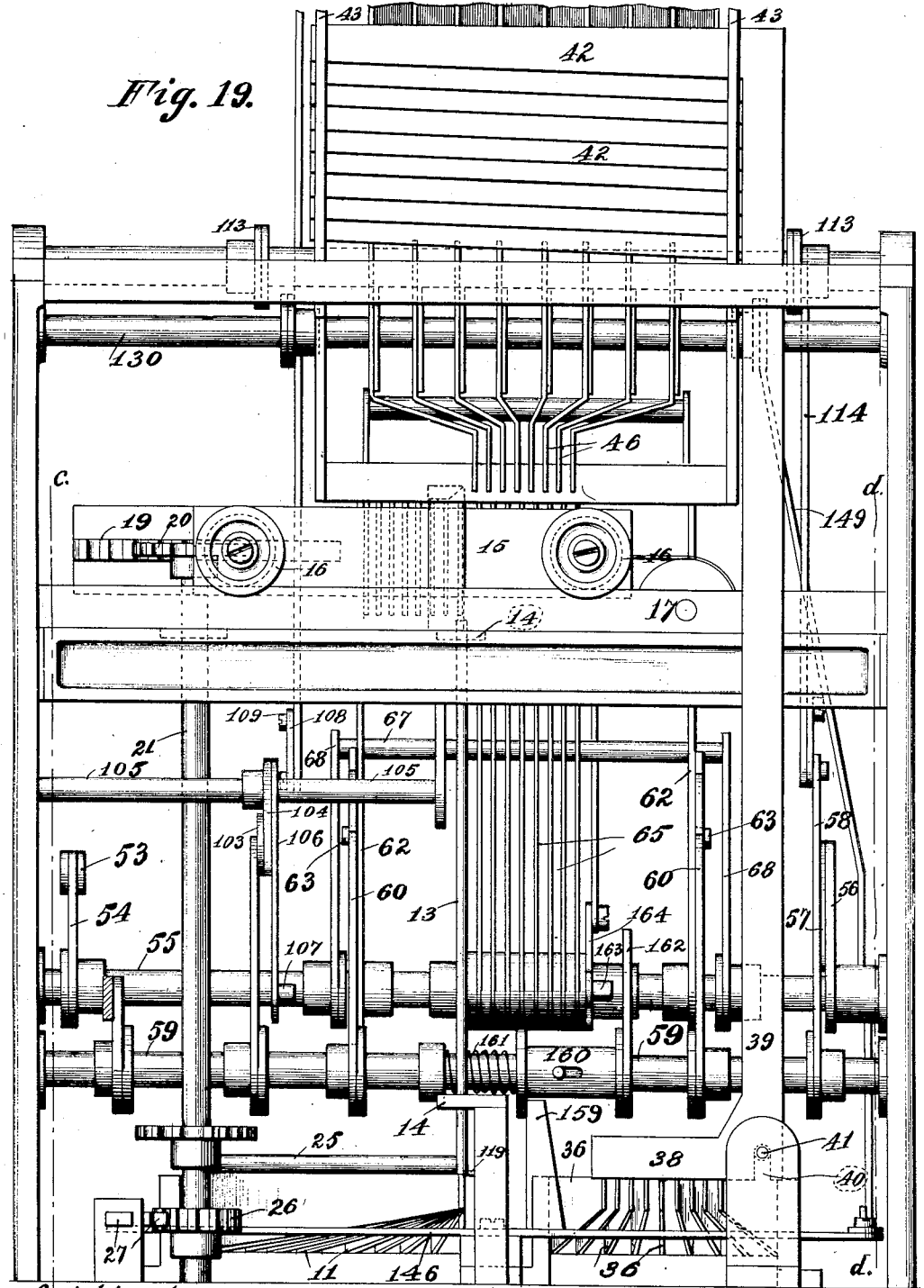

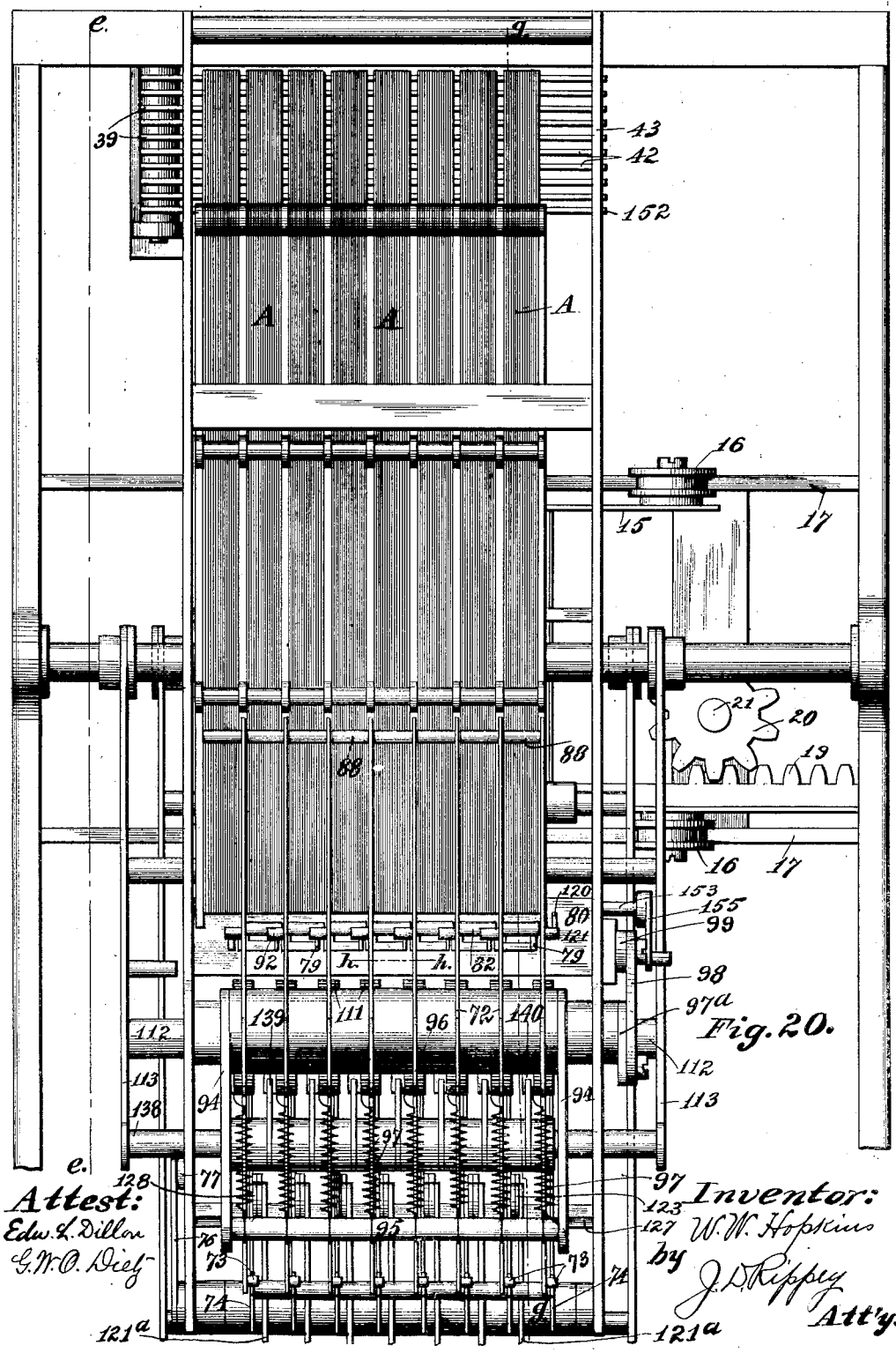

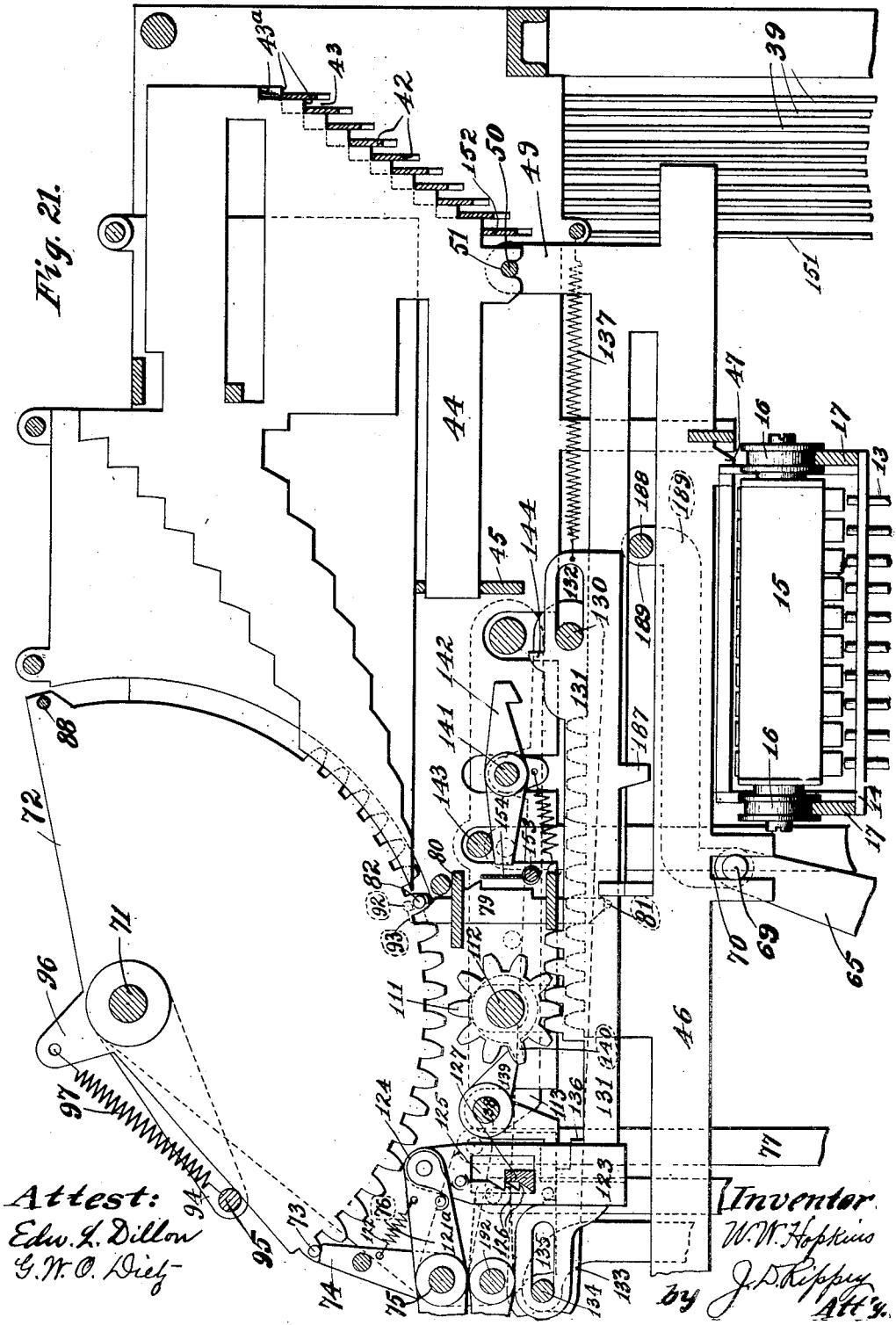

No. 844,519. PATENTED FEB. 19, 1907.
W. W. HOPKINS.
MULTIPLYING AND TYPE WRITING MACHINE.
APPLICATION FILED MAY 12, 1904.
17 SHEETS—SHEET 14.
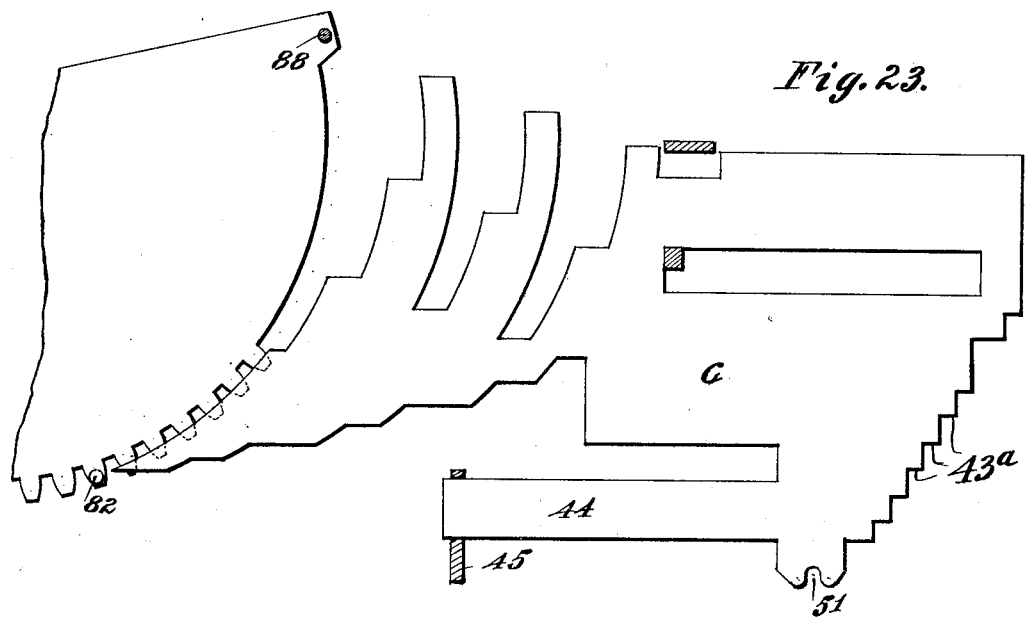
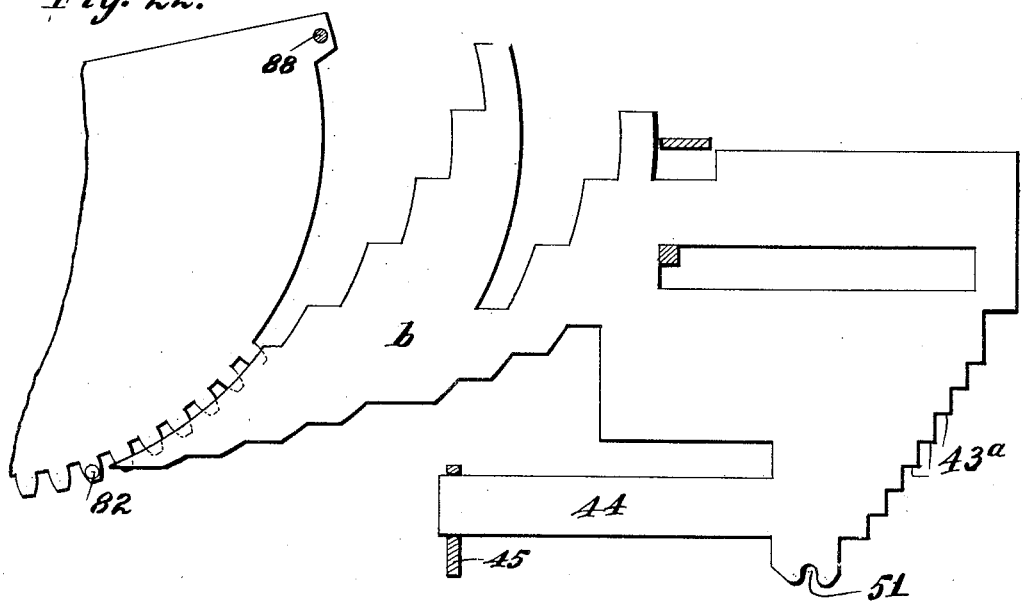
Attest:
Edw. L. Dillon
G. W. O. Dietz
Inventor:
W. W. Hopkins
by J. D. Rippey
Att'y.

No. 844,519. PATENTED FEB. 19, 1907.
W. W. HOPKINS.
MULTIPLYING AND TYPE WRITING MACHINE.
APPLICATION FILED MAY 12, 1904.
17 SHEETS—SHEET 15.

Attest:
Edw. L. Dillon
G. W. O. Dietz

Inventor:
W. W. Hopkins
by J. D. Rippey
Att'y

No. 844,519. PATENTED FEB. 19, 1907.
W. W. HOPKINS.
MULTIPLYING AND TYPE WRITING MACHINE.
APPLICATION FILED MAY 12, 1904.

17 SHEETS—SHEET 16.

Attest:
Edw. L. Dillon
G. W. O. Dietz

Inventor:
W. W. Hopkins
by J. D. Rippey
Att'y.

No. 844,519. PATENTED FEB. 19, 1907.
W. W. HOPKINS.
MULTIPLYING AND TYPE WRITING MACHINE.
APPLICATION FILED MAY 12, 1904.
17 SHEETS—SHEET 17.

Attest:
Edw. L. Dillon
G. W. O. Dietz

Inventor:
W. W. Hopkins
by J. D. Rippey
Att'y

UNITED STATES PATENT OFFICE.

WILLIAM W. HOPKINS, OF ST. LOUIS, MISSOURI, ASSIGNOR TO MOON-HOPKINS MANUFACTURING COMPANY, OF ST. LOUIS, MISSOURI, A CORPORATION OF MISSOURI.

MULTIPLYING AND TYPE-WRITING MACHINE.

No. 844,519.      Specification of Letters Patent.      Patented Feb. 19, 1907.

Application filed May 12, 1904. Serial No. 207,569.

*To all whom it may concern:*

Be it known that I, WILLIAM W. HOPKINS, a citizen of the United States, a resident of St. Louis, Missouri, have invented new and useful Improvements in Multiplying and Type-Writing Machines, of which the following is a specification.

This invention relates to multiplying and type-writing machines; and it consists of the novel construction, combination, association, and arrangement of elements and the novel operative functions thereof, all of which are shown in the drawings and herein described and claimed.

The object of my invention is to produce a machine having registering devices wherein numbers may be registered by striking them on a suitable keyboard, in combination with multiplying devices for operating the register to multiply the number therein any desired number of times, (up to the capacity of the machine,) to provide key-controlled mechanism for governing the multiplying devices so that all parts are directly under control of the operator, to provide printing mechanism so that the product may be recorded, and to provide independently operative type-writing mechanism to meet other requirements, which are well understood, all of said devices being embodied in a single integral machine.

Figure 2:
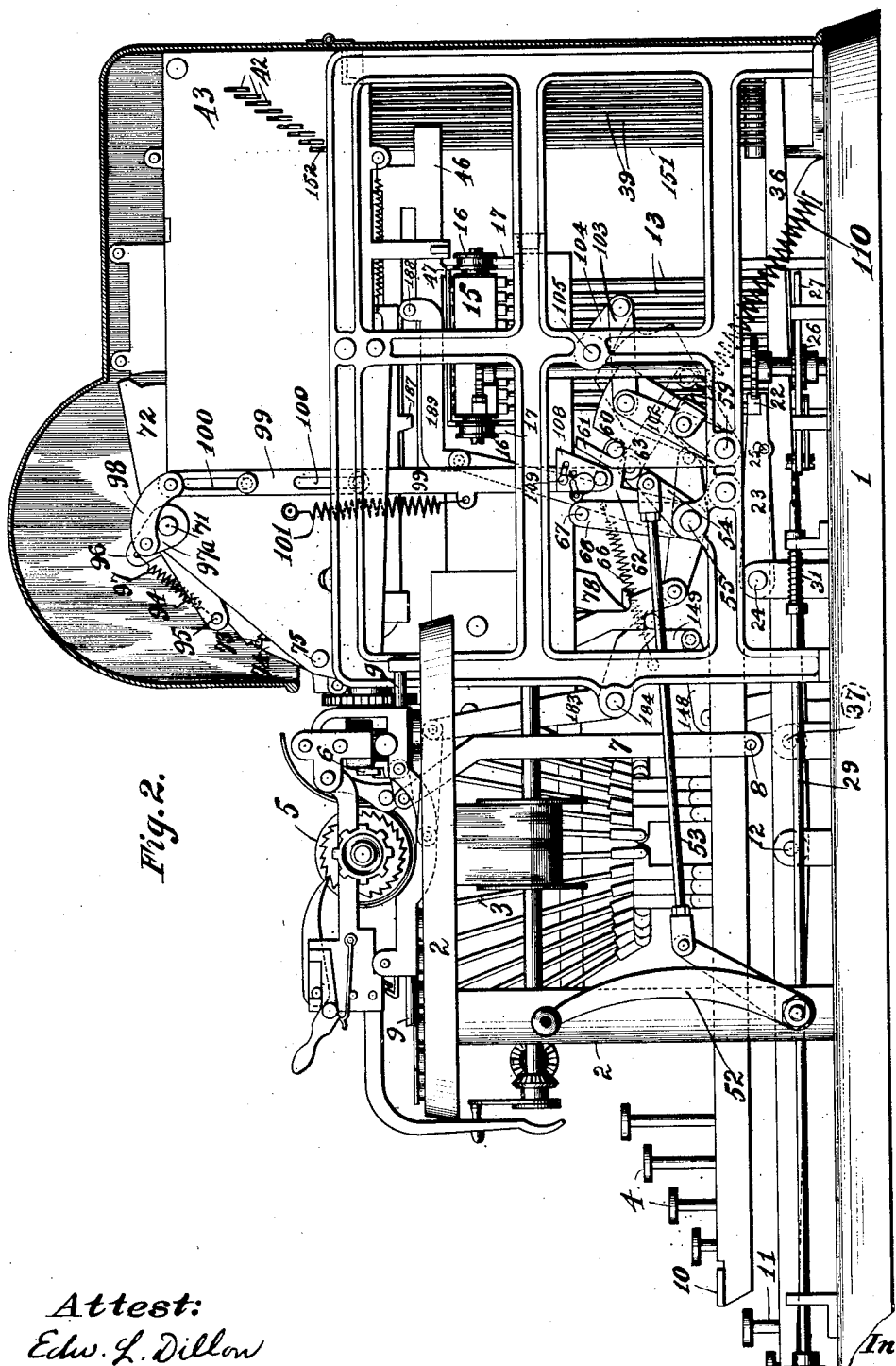
Figure 3:
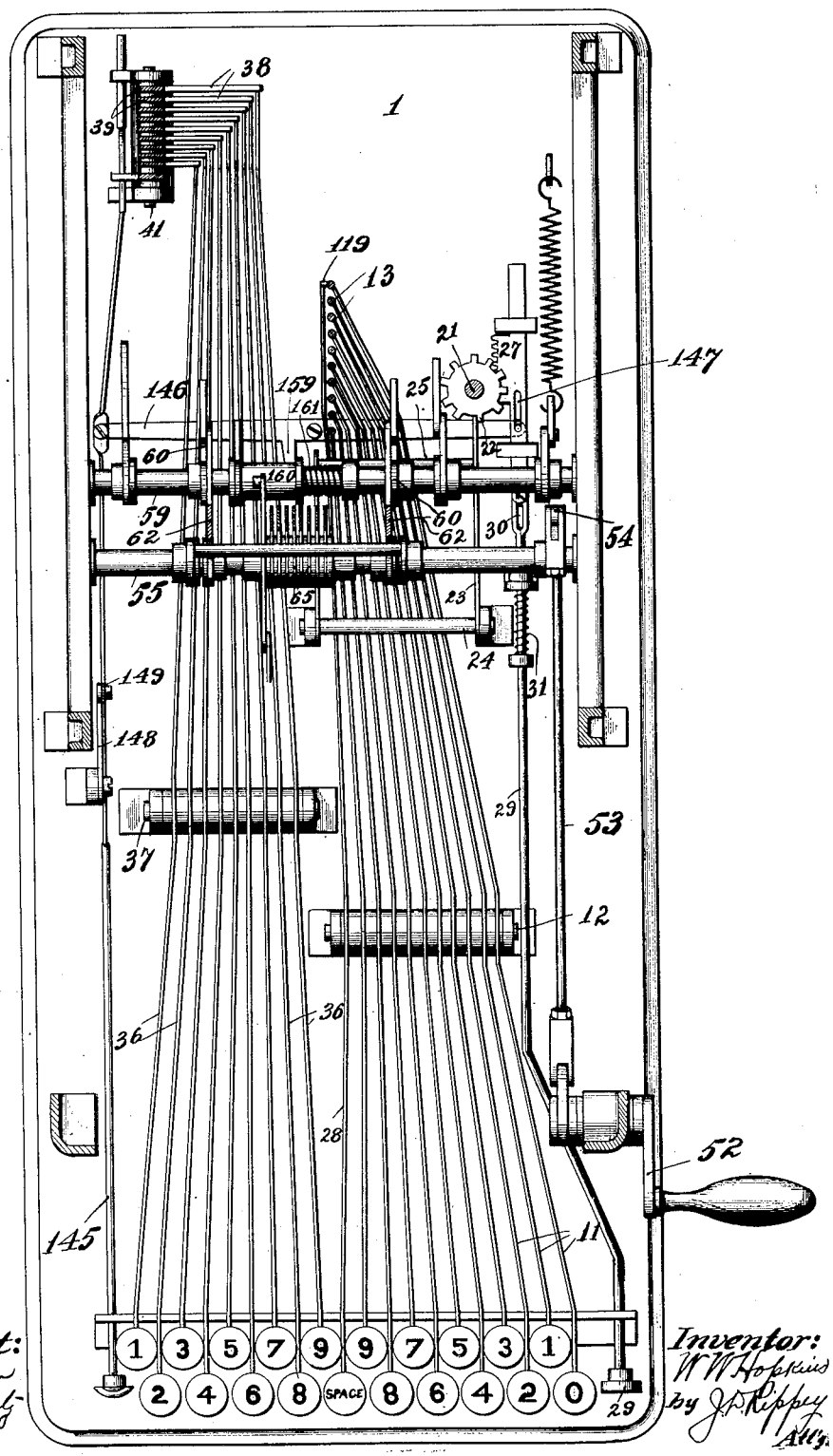
Figure 4:
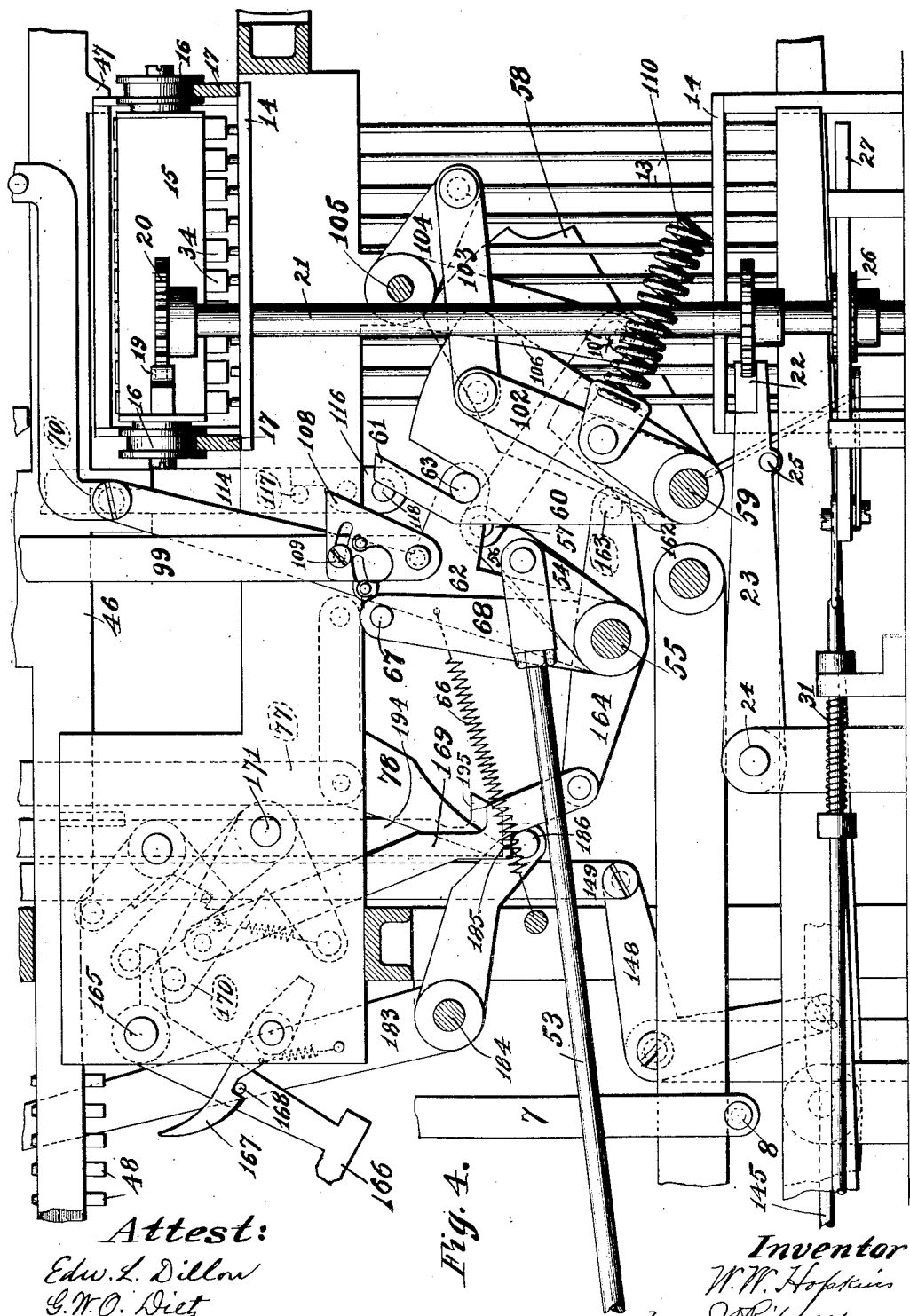
Figure 5:
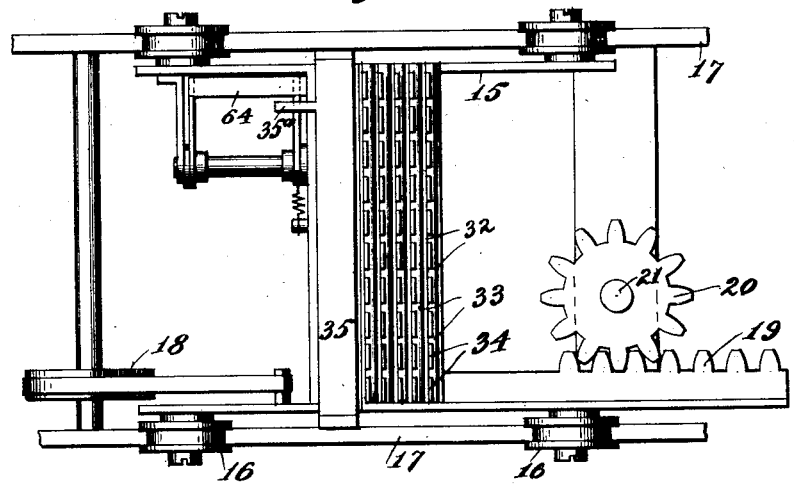
Figure 6:
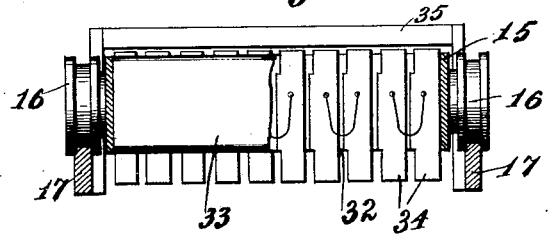
Figure 7:
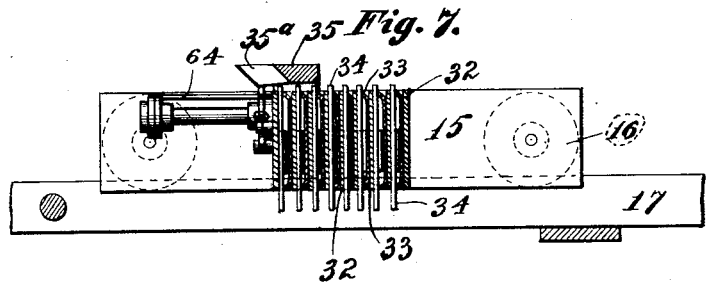
Figure 12:
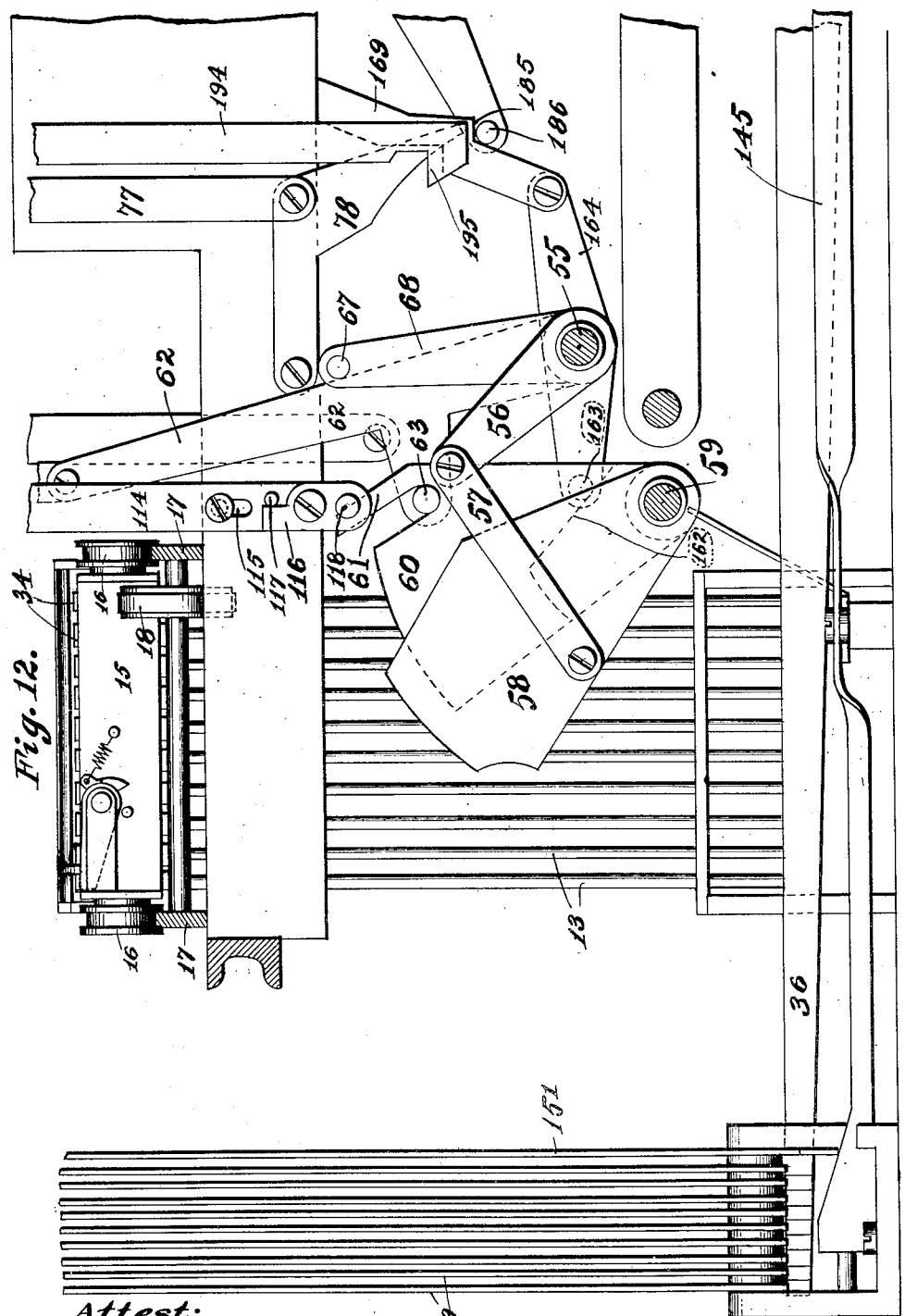
Figure 25:
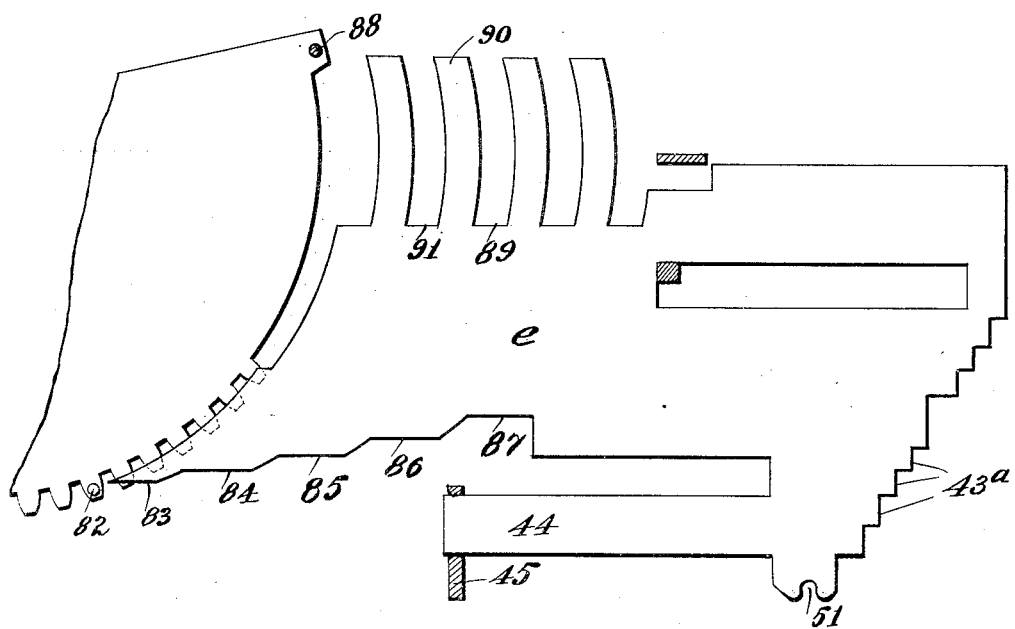
Figure 24:
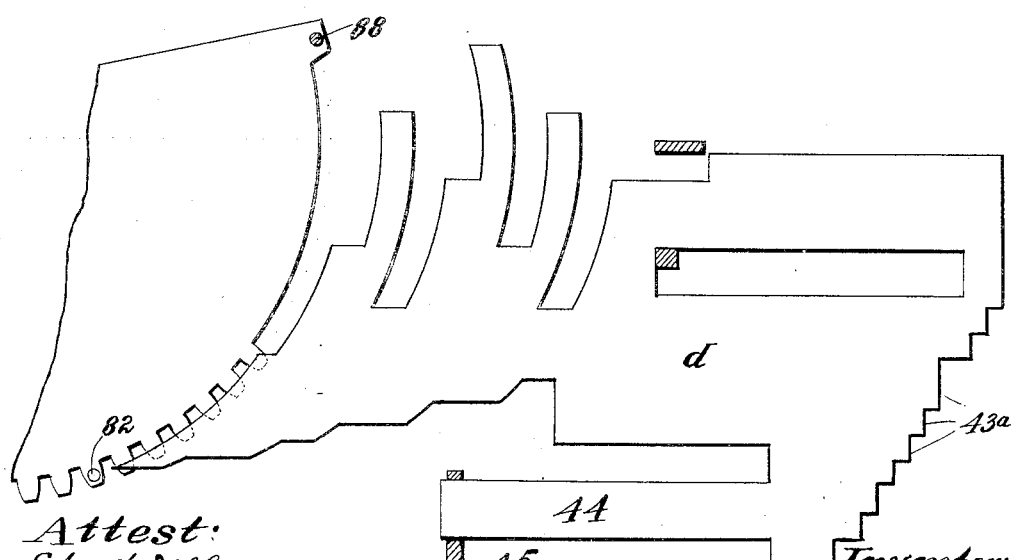
Figure 27:
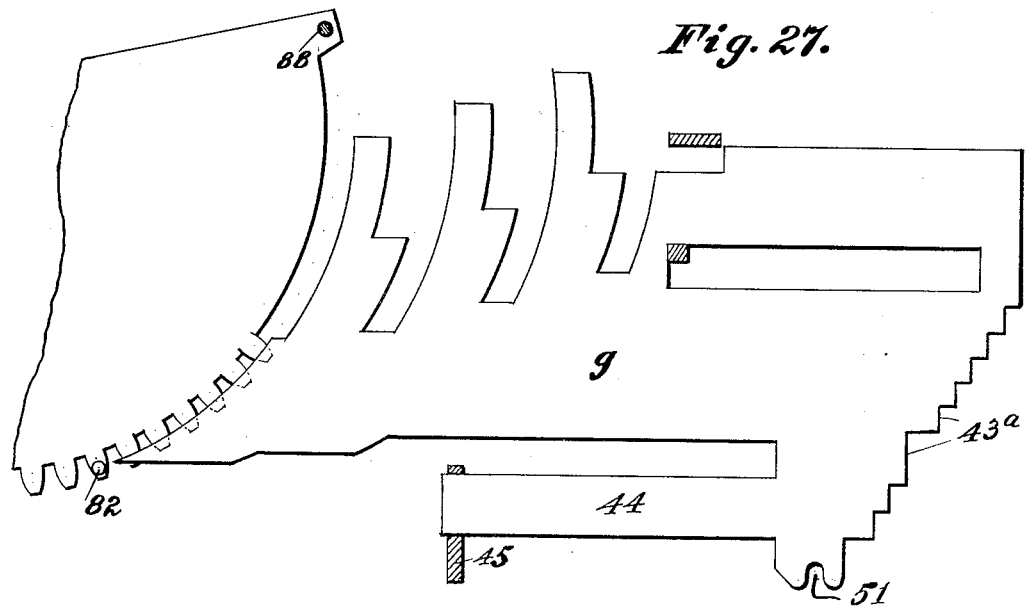
Figure 26:
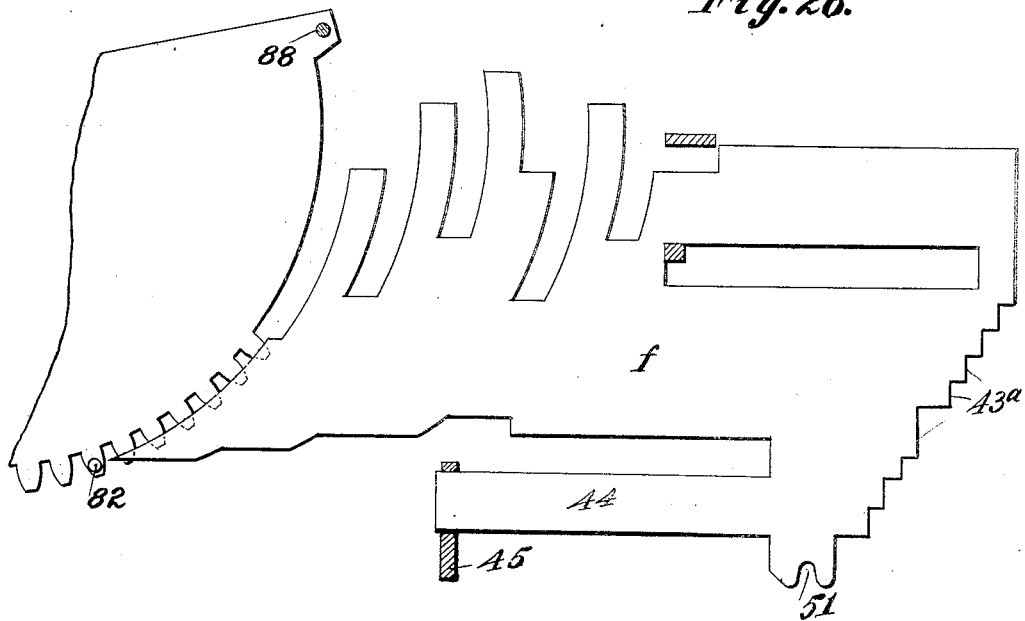
Figure 29:
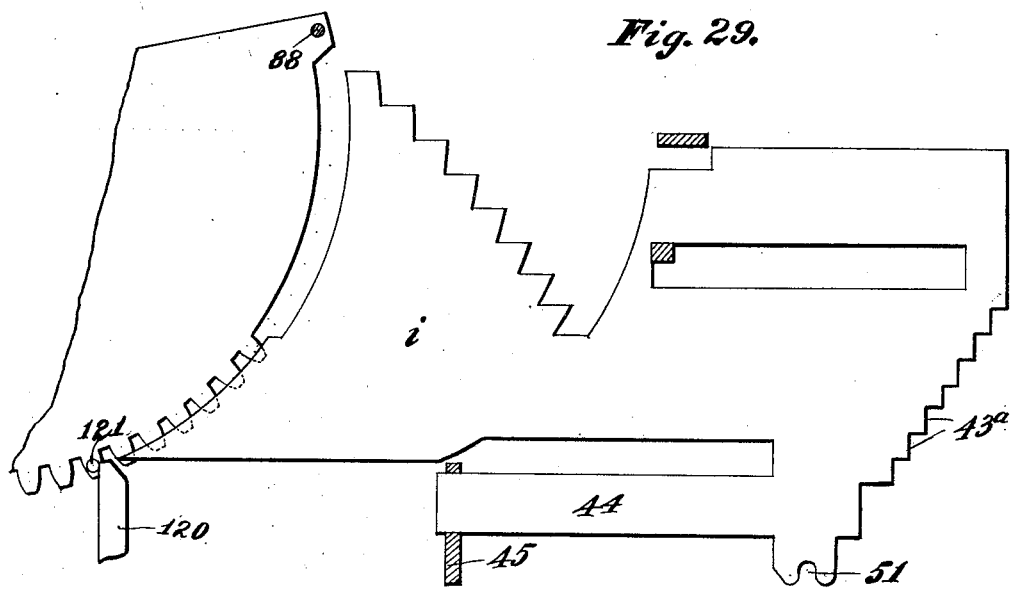
Figure 28:
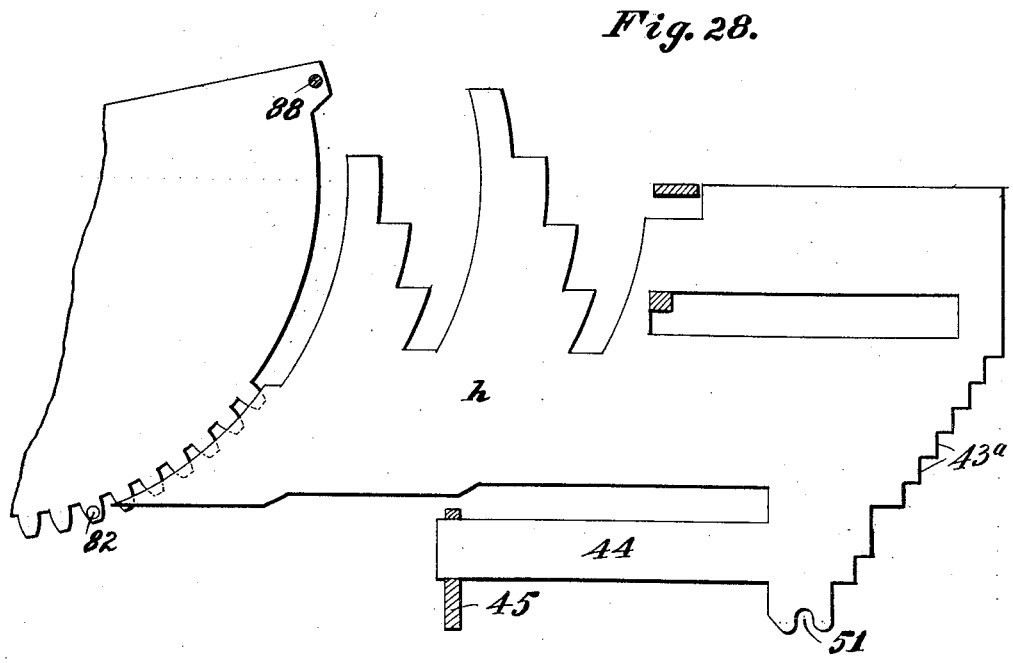

Figure 1 is a plan view of my machine. Fig. 2 is a side elevation, the case being sectioned in order to disclose the interior mechanism. Fig. 3 is a plan view of the multiplying-mechanism keys and the associated parts. Fig. 4 is a sectional view on the line *c c* of Fig. 19. Fig. 5 is a plan view of the register-carriage and its mountings. Fig. 6 is a detail sectional view of the carriage. Fig. 7 is a cross-section thereof. Fig. 8 is a view showing the arrangement of the printing-hammers. Fig. 9 is a rear view of the same. Fig. 10 is a plan view thereof. Fig. 11 is a view showing the arrangement of the devices which control the operation of the hammers. Fig. 12 is a section on the line *d d*, Fig. 19. Fig. 13 is a section of the upper portion of the machine on the line *e e*, Fig. 20. Fig. 14 is a plan of the product-register and associated parts. Fig. 15 is a section on line *a a* of Fig. 14 looking rightward as indicated and showing also the conveyance of the racks which carry the type on their front ends. Fig. 16 is a section on line *f f* of Fig. 14. Fig. 17 is a section on line *b b* of Fig. 16. Fig. 18 is a detail rear elevation of one group of multiplying-plates, enlarged. Fig. 19 is a rear view showing the relation of the multiplying devices, including the keys, with the registering parts. Fig. 20 is a plan of the entire multiplying mechanism. Fig. 21 is a section on the line *g g* of Fig. 20 and illustrating in detail the construction of the "9" multiplying plates or parts. Fig. 22 shows the "8" multiplying-plates—*i. e.*, the construction of the plates or parts operated when the digit "8" is used in any relation in the multiplier member to increase the multiplicand by the multiplying process. Fig. 23 shows one of the "7" plates. Figs. 24 and 25 show the "6" and "5" plates, respectively. Figs. 26 and 27 show the construction of the "4" and "3" plates, respectively. Figs. 28 and 29 show the construction of the "2" and "1" plates, respectively. Fig. 30 is a sectional view taken on the line *h h* of Fig. 20, showing stop device used to stop forward movement of the sectors when any digit is carried thereto in multiplying.

Briefly stated, a number is multiplied on this machine by striking the multiplicand on a set of keys which register the number in a register. After the number has been registered the multiplier-number is struck on a group of keys, which by suitable intermediate operative devices will coöperate with the register, thereby multiplying the number contained therein, producing instead a result and performing in such operation the necessary processes of addition involved. Type-writing mechanism is associated in an integral machine, and the platen thereof is utilized by the recording devices of the multiplying department to record thereon, so that words, signs, and symbols may be recorded on the same sheet of paper in any desired relation to the mathematical or arithmetical records.

The base 1 upholds the frame 2, in which are arranged the type-bars 3 belonging to the typewriter-department. The keys and key-levers 4 have suitable lever connections with the type-bars 3 and are arranged to strike at a common point on the platen 5. Said platen is provided with the usual attachments for rotation and with an escapement 6 of known construction, controlled by the key-levers 4 through the medium of the connections 7 and the cross-rod 8. The entire frame of the platen is mounted to slide backward and forward upon two rods or tracks 9, but is normally retained at its forward limit of movement, and is moved rearward when required for different case type and also when record is made by the multiplying department. The escapement may also be operated by the type-writer spacing-key 10. The usual ribbon, spools, and operating connections are used.

The key-levers 11, ten in number, belong to the multiplying department and are grouped, preferably, near the right of the keyboard and are used to strike the multiplicand into the register, Figs. 1 and 3. Said levers are pivoted at 12 and extend rearwardly, and their extremities are in a parallel line longitudinally in the machine and are provided with small flat surfaces, upon each of which rests a vertically-movable rod 13, Figs. 2 and 19, said rods being in openings in retaining-supports 14. The rods 13 are in a longitudinal row and underlie a transversely-movable carriage 15, said carriage constituting a register, mounted, by means of rollers 16, upon the two track members 17. Said carriage-register is actuated leftward relative to the operator by a motor 18, and its movement is controlled by a rack 19, attached thereto and meshed with a gear 20 upon the shaft 21, Figs. 5 and 19, rotation of the shaft being controlled by an escapement 22 of any preferred known construction. The escapement-bar 23 is attached to a rock-shaft 24, Figs. 3 and 4, and is raised and lowered with the rear ends of the key-levers 11, thereby permitting the shaft to turn and the register-carriage 15 to be drawn one step leftward each time a key is operated. The device for raising the bar 23 consists of the rod 25, connected thereto and overlying the key-levers, the opposite end of the rod being supported by an arm on the shaft 24. A gear-wheel 26 is on the shaft 21 below the escapement and meshes with the sliding rack 27 and operates the latter in its supports when the register-carriage moves. The multiplier spacing-key 28 extends under the rod 25 and also controls the escapement 22 to permit leftward travel of the register-carriage, the purpose of which will be properly explained.

A rod 29 is suitably mounted in bearings and has a slot 30 in its rear end through which a pin extends, connecting said rod loosely with the front end of the rack 27, so that said rack may travel forward without moving the rod, which is actuated forwardly by a spring 31. To restore the register-carriage to idle position to correct any error made in striking the number on the keys, the rod 29 is pushed back, which operation, through the medium of the rack 27, turns the shaft 21, and thereby restores the parts.

The register-carriage 15 comprises a series of plates 32, between which are the curved strips 33, Fig. 7, having notches in their upper and lower edges in which the pins 34 reside and which are held in proper position by springs or other suitable devices. The row of pins 34 at the left relative to the operator is over the rods 13 when in idle position, one pin being provided in each row for each of the ten rods. The operation of a key, therefore, will first raise one of the pins and then release the escapement 22, so that the carriage 15 will be drawn leftward one step to bring the next row of pins over the rods 13. This operation is repeated until the required number of pins have been pushed up. When the carriage is drawn back by operation of the rod 29 or otherwise, the pins are restored to idle position by being drawn under the member 35, which has its left under corner inclined, and forces the pins down. The pins 34 are arranged in rows, with ten pins in each row, the rearward pin of each row representing "0," the next pin "1," and so on, so that any one of the ten digits can be registered in each row.

After the number has been registered in the register-carriage the next operation is to strike the multiplier-number on the keys provided therefor. The multiplier-keys 36 are preferably arranged near the opposite side of the machine from the keys 11, with the multiplier spacing-key 28 separating the two groups. Including the said key 28 there are ten of these keys, one for each of the digits. The levers of the keys 36 are pivoted at 37. The rear end of each of said levers underlies a horizontal projection 38, Figs. 3 and 19, rigid with a vertically-movable member 39, properly guided by the slots 40, inclosing a rod 41. It follows that operation of either of the keys 36 will raise a distinct member 39 belonging thereto. The upper end of each of the members 39 carries a horizontal extension 42, which operate in slots formed in the side or frame plates 43.

Mounted longitudinally near the upper rear end of the machine is a series of groups A of multiplying devices in the form of plates. There are nine plates in each group, one plate for each digit, not including the "0." The plates of each digit are identical in construction throughout the different groups; but the plates of the different digits have distinctive constructions. These plates are related to the register-carriage 15 in such manner that each plate may be moved to register the product of a digit in the number registered in the carriage 15 multiplied by the digit which the plate represents. The opposite edges of the plates are formed to register the digits of the product, the tens of the product being indicated on one edge and the units of the product on the opposite edge of the same plate. In the problem herein followed it will be shown that while each plate constitutes a complete register for the product of a digit of the multiplicand multiplied by the digit of the multiplier-number for which the plate stands, yet the tens and units are carried forward and registered in their respective orders in a set of register and total wheels, from which the final product may be recorded and the machine cleared for further use by the same operation.

The plate for the digit "9" is designated by $a$, for "8" by $b$, for "7" by $c$, for "6" by $d$, for "5" by $e$, for "4" by $f$, for "3" by $g$, for "2" by $h$, and for "1" by $i$. In the arrangement shown the "9" plate is at the right of each group relative to the operator, and the other plates are in consecutive order down to "1" at the left. The arrangement of the plates in the groups is immaterial so long as each digit is represented by a plate. Referring now to the relation between these digit or multiplying plates and the keys 36 through the medium of the members 39 and the horizontal extensions 42, attention is directed to Figs. 18, 19, and 20. The parts 42 extend across the rear ends of all the plates $a\ b\ c$, &c. The rear ends of the corresponding digit-plates in the different series are identical, and each is provided with a series of shoulders 43$^a$, Fig. 18 and Figs. 21 to 29, inclusive. The rearmost member 39 is connected to the "9" key, and said member carries the uppermost extension 42. The extension 42 belonging to the "9" key rests directly under and against all the shoulders 43$^a$ except those on the plates $a$ representing the digit "9." As shown in Figs. 18 and 21, the shoulder on the plate $a$ of the series indicating the digit "9" is above the shoulders on the other plates of the series. Therefore when the "9" key is operated all the series except the plate $a$ in each series will be lifted up by the extension 42 controlled by said "9" key. Likewise all the plates in all the series of groups will be uplifted by the "8" key-controlled member 42 except the plates $b$ denoting "8," and so on through the series of keys and plates, each key on operation moving all the plates except the plates corresponding to the digit of the key operated.

All the plates $a\ b\ c$, &c., are held vertically in suitable frames and have arms 44, Figs. 21 to 29, inclusive, which extend through and operate in slots in the cross member 45, and hence are properly guided. A series of bars 46 is mounted in suitable supports and are movable longitudinally in the machine. Said bars are just at the left of the idle position of the register-carriage 15, and the relative arrangement is such that the first step of the carriage leftward moves the first row of pins 34 under the first bar, and the next step carries a row to the next bar, and so on. Shoulders 47 are formed on the bars 46 and are adapted to engage or strike against the pins 34, which are positioned as above specified when the bars are moved, and the arrangement is such that very slight movement is permitted to the bars which are stopped by the rearmost or "0" pins. Types 48, Fig. 4, are movably carried by the front ends of the bars 46, ranging from "0" at the extreme front to "9" on each bar, so that the movement of the bars as determined by the register-pins 34 will locate the corresponding type under the platen in position to be driven against the paper. The rear end of each bar carries a projecting arm 49, Figs. 19 and 21, there being one bar for each group A of multiplying-plates, so that there is also one arm for each group. Each of the arms 49 carries a horizontal pin 50, Figs. 18 and 21, the length of each pin being sufficient to extend entirely under a group of plates. Notches 51 are formed in the lower sides of the multiplying-plates, and said notches inclose the pins 50, thereby forming connection between the plates $a\ b\ c$, &c., and the bars 46, one bar controlling an entire group of plates. When any key 36 is operated, all the plates will be raised and released from the pins 50 except one plate in each group A, the plates not so released being the plates representing the digit of the key operated. Therefore when the bars 46 are moved forward, as hereinafter set out, each bar which moves will carry with it one plate of the corresponding group of plates. After the multiplicand-number has been registered in the register-carriage as described the first digit at the right of the multiplier-number is struck on its proper key, which, through the member 39, releases all the plates $a\ b\ c$, &c., except one in each group. Then the rack-bars 46, for which pins 34 had been positioned, are moved as now to be described, and such movement operates the plates still in connection therewith.

An operating-handle 52 is conveniently mounted and by a link 53 connects with a lever 54, rigid on a shaft 55, so that forward operation of the handle will rotate the shaft. Another lever 56, Figs. 4 and 19, is rigid on said shaft and by a link 57 connects with a cam 58, rigid upon a shaft 59, upon which are two cam-levers 60, so that forward operation of said handle 52 also rotates the shaft 59, and thereby moves the cam-levers 60. An arm 61 extends upward from the front corner of each of said cam-levers 60, thereby forming a slot. Two levers 62 are mounted on the shaft 55 just in front of the cam-levers 60, each having a rearward-projecting arm upon which is a lug 63, extending into the slot formed by the arm 61 on the corresponding cam-lever 60, so that the latter will move the levers 62 when operated. A spring-actuated plate 64 is pivotally supported in the carriage 15 and in idle position is held down by a projection 35ª on the bar 35 below the plane of the projections 47, so that all of the bars 46 can be moved as required to print the result when the carriage is in its idle position. The first step of the carriage leftward moves the plate beyond the projection 35ª, and the plate is then drawn up in front of all the projections 47 except the one on the first bar, and each stop of the carriage afterward moves the plate beyond and releases one additional bar, so those necessary can move against the prepositioned pins 34. Movement is imported to the bars by levers 65 on the shaft 55, said levers being actuated forward by springs 66, connecting them with some stationary part of the machine. All the levers 65 are normally held back against the tension of their springs 66 by a cross-rod 67, carried by two arms 68, rigid on the shaft 55, which, however, are moved forward upon operation of the handle 52 to release the levers 65. Thereupon such of the levers whose bars 46 had been released from restraint by the pawl 64 will be drawn forward until the projections 47 strike the pins 34. The connection between the levers 65 and the bars 46 whereby the latter are moved comprises a pin 69, Fig. 21, on each lever, said pin extending into a slot 70 on the corresponding bar 46, so that the resulting operation is apparent.

The result of the operation set out is to place the bars 46 against the positioned pins 34 and to move forward one of the multiplying-plates a, b, or c, &c., for each bar which moves, the multiplying-plates being moved forward corresponding to the digit of the multiplier-number which had been struck on the keys 36. The next occurrence is the multiplication of the number registered in the register-carriage by the first digit of the multiplier-number. Let "345" be the number in the register-carriage to be multiplied by "125." It follows that "5" is the first digit struck on the keys 36. Hence the result produced by operating the handle 52 is 345
(12)5,
———
1725 which result is produced by the coöperation with the parts described of the following devices: A shaft 71, Figs. 2, 13 and 21, is supported above and in front of the groups A of plates a b c, &c., and a series of gear-sectors 72 is mounted thereon, there being one sector for each group A, likewise one for each bar 46. A pin 73 is on the forward corner of each sector, and said pins in idle and normal position rest upon the posts 74 of equal height, thereby alining the sectors. The posts 74 are rigid on a shaft 75, to one end of which is fixed an arm 76, Fig. 13, having a link 77 pivoted thereto, the lower end of the link being connected to a cam-lever 78, pivoted on the frame, Fig. 12. The cam-lever 78 has a depending arm, against which the rod 67 rubs when moved to release the levers 65. The said rod 67 does not engage the lever 78 until after the levers 65 have moved the bars 46 against the prepositioned pins 34; but as soon as the bars 46 (with the plates a, b, or c, &c., moved thereby) have been positioned then the lever 78 is raised and the posts 74 moved forward away from the pins 73 and releasing all the sectors 72 from restraint thereby. An additional lock is provided for each sector, comprising a vertically-movable slide 79, the same being located in slots in horizontal guides 80, movement of the slides being limited by shoulders formed thereon. Said slides are normally held up, as shown in Fig. 21, between teeth on the sectors 72 by pins 81, Fig. 16, on the bars 46, the units-bars holding the lock for the tens-sector, tens-bar for the hundreds-sector, and so on. Forward movement of the bars 46 carries the pins 81 from under the slides 79, and the slides then drop from the teeth on the sectors 72 and release the latter to one higher order than the number of bars which had been moved.

After release of the sectors 72, corresponding to the bars 46 moving forward, the first operation is backward movement of the sectors 72, as required, to take up the addition of the digits carried to the higher orders in the process of multiplication. To illustrate, by the number "345" as multiplied by "5" in the number "125:" When the "5" is multiplied by "5", the result is "25," and the digit "2" must be added to the result of the "4" when the latter is multiplied, so that the sector 72 in tens order moves backward two teeth to take up the "2." When the "4" is multiplied by "5," the result is "20," and the digit "2" must be added to the result of the "3," when the latter is multiplied, so that the sector 72 in hundreds order moves backward two teeth to take up the "2." When the "3" is multiplied by "5," the digit "2" is also added to the result thereof, and the first operation of the sectors to which any digit is added is to move backward the required distance to take up the addition. So the sector in tens place in the problem being illustrated moves back to include the "2" in product of "5×5," and likewise the sector in hundreds place moves back to include the "2" in product of "4×5," &c. This result is produced by plates a b c, &c., which had been projected forward between the sectors 72, coöperating with the latter, as follows: When digits are to be carried into the higher orders, the backward movement of the sectors receiving the digits is limited by the plates a b c, &c., of the lower orders—i. e., backward movement of the tens-sector in the problem being illustrated is limited by the plate e in units place, Fig. 25, which represents "5" in the multiplier number, and is therefore the plate moved in each group A by the three bars 46 which moved. The bar 46 in units place represents "5" in the number "345," and therefore moves forward five spaces, measured in the register-carriage, and the plate e, controlled thereby, moves a like distance. The bar 46 in tens place moves four spaces to represent "4" in the number "345," and the plate e in the second group controlled thereby moves a like distance. The bar 46 in hundreds place moves three spaces to represent "3" in the number "345," and the plate e in the third group controlled thereby moves a like distance. A pin 82 is rigid with the "0" tooth of each sector 72 except the units-sector, Figs. 20 to 29, inclusive, and projects toward the right, so that when the plates a b c, &c., are moved forward said pins 82 will upon backward rotation of the sectors strike against the under edges of the plates which had been positioned, and in the present problem, three plates (one in each of the three groups A at the right) having been moved forward, it follows that three of the sectors 72 will turn backward until stopped by their pins 82 striking the under edges of the plates e, and it is to be observed that the plates in the group A, controlled by the units-bar 46, limit backward movement of the tens-sector 72, the tens group stops the hundreds-sector, and so on. (See Fig. 20, illustrating the pins and plates in plan view.) On the under side of the plate e (see Fig. 25) is a series of shoulders against which the pins 82 strike. The lower shoulder 83 is the stop for the "0"— that is, it will detain the sector 72 in the next higher order from any backward movement, so that when the plate e moves only one step forward to register "1" there is nothing carried to the higher order. If either "2" or "3" be multiplied by "5," the digit "1" is carried to the next higher order, and hence a shoulder 84 is formed to stop the sector, said shoulder being in length equal to two spaces in the register-carriage 15, so that the first two shoulders cover three spaces. In the problem "345×125," as carried out in this machine, the units-order plate e moves five steps, so that the shoulder 85, which represents "2" in the product of "5×5," serves to stop the sector 72 in tens place after it moves two teeth rearward. The shoulder 86 represents "3" of the higher order in any result of a digit multiplied by "5," and the shoulder 87 represents "4" of the higher order when required. Therefore the construction is such that the under edges of all the individual plates a b c, &c., represent the tens-digits in the results produced by the multiplication of the digits registered by the bars 46 by that digit of the multiplier number which each plate represents. The arbitrary construction of the individual plates is shown in the different views of the drawings, and it is believed that the specific description of the operation in the problem illustrated, together with the views of the individual plates, will enable any one skilled in this art readily to trace the operation in other instances. Observing now that the sector in tens place in the problem is back two teeth or spaces, the sector in hundreds place is back two teeth or spaces, and the sector in thousands place is back one tooth or space, it is necessary to show how the units are registered in the result of the individual digits in the multiplicand multiplied by the first digit of the multiplier. The problem being carried out in full is thus:

$$\begin{array}{r} 3\ 4\ 5 \\ (12)\ 5 \\ \hline 2|5 \\ 2|0 \\ 1|5 \\ \hline 1725 \end{array}$$

Produced by backward movement of the sectors.
Produced by forward movement of the sectors.
Result of both movements.

This is accomplished by moving the sectors 72 forward as far as necessary to take up the digits in units place of each result and also the additional distance which each had moved back. The forward movement is determined by pins 88, one of which is on the upper corner of each sector 72, Fig. 20, striking upon stop-shoulders upon the prepositioned plates e. As the plate e in units place—i. e., the plate moved by the bar 46 at the right—has moved five spaces to register "5," the units-digit in "345," the pin 88 on the units-sector 72 will strike the fifth shoulder or stop on the plate which is indicated, Fig. 25, by 89, and the movement of the sector carries it forward five teeth or spaces and it registers "5." The second or tens plate e has moved forward four spaces to register "4" in "345," and the tens-sector 72 has turned back two spaces, as above explained, and its forward movement will be limited by the fourth shoulder or stop, (indicated by 90 on the plate e in the second group.) Therefore the tens-sector moves two teeth forward to its normal position. The third or hundreds plate e has moved forward three spaces to register "3" in "345," and the third or hundreds sector 72 has moved back two teeth or spaces. Hence when moving forward and stopped by the third shoulder or stop 91 it moves altogether seven spaces or teeth. The fourth sector has moved back one space and when restored to idle position travels forward a corresponding distance, and hence registers "1," and the product so registered is "1725," being "345 × 5." Forward movement of the fourth sector, representing the "1" in the number, is limited by its auxiliary stop, one of which is provided for each sector except units, for which none is needed. The auxiliary stop consists of a pin 92, Figs. 20 and 30, on the left side of each sector 72 at sufficient height to clear the ends of the unmoved plates a b c, &c., and arranged to strike a lug 93 on the upper end of the slide 79 belonging to the sector of the next higher order if held up, so that when the sector moves back to idle position, as in the problem illustrated, it will be stopped. If the slide 79 is lowered, as in the case of the sectors released, the pins of the sectors of the lower orders will pass clear of the slide, and in this connection it is observed that the slide holding any sector from movement controls the sector of the next lower order from forward movement beyond idle position.

The movements ascribed to the sectors 72 are mechanically brought about at the required times during operation of the handle 52 by the following devices: Two arms 94, Figs. 20 and 21, are attached to the shaft 71 and are connected by a rod 95. Each sector 72 has an arm 96 rigid therewith, and independent springs 97 connect the arms with the rod 95, the tendency of the springs being to rotate the sectors. The normal position of the rod is in front of the arms 96, as shown in Fig. 20, and when the sectors are released from restraint by the lock devices 74 and 79 they will be rotated until their pins 82 engage the shoulders on the plates a b c, &c., which had been positioned, as described. The continued forward movement of the handle 52 causes the arms 94 to swing upward and backward to place the rod 95 behind the arms 96, and then the sectors will be driven forward until stopped, as described. An arm 97ª, Figs. 2 and 20, is fastened on one end of the shaft 71, and a curved link 98 is pivoted to the arm and connects at its other end with a slide member 99, held by pins or rivets passing through slots 100 and allowing movement thereof. Normally the slide 99 is upheld by a strong spring 101, so that the shaft 71 will hold the arms 94 forward, as shown. The shaft 59 carries an arm 102, Fig. 4, connected by a link 103 with an arm 104 on a shaft 105. An arm 106 is rigid with the shaft 105, and, as apparent, the connections described will turn the shaft 105 and raise the arm 106 when the handle 52 is operated. A lug 107, Fig. 19, projects from the arm 106. A catch-plate 108, Fig. 4, is pivoted to the lower end of the slide 99 and is retained by a screw 109 in a slot which allows movement of the plate and is actuated rearwardly by a spring. Upward movement of the arm 106 rubs the lug 107 against the edge of the plate 108 and pushes the latter forward, and ultimately the lug travels beyond the plate, whereupon the latter is snapped back by its spring. When the handle 52 is released, the spring 110, communicating with the shaft 59, restores the parts thereon to idle position, and when the arm 106 is drawn downward the lug 107 thereon engages the upper edge of the plate 108 and pulls the slide 99 downward, which turns the shaft 71, Fig. 2, and thereby moves the rod 95 behind the arms 96, and the springs 97 then move the released sectors forward until stopped, as described. In its continued downward movement the lug 107, which travels in the arc of a circle, passes off of the plate 108, and the spring 101 then immediately raises the slide 99, and thereby moves the rod 95 back to the position shown. The spring 110 by drawing the rod 67 back also restores the bars 46 and such of the plates a b c, &c., as had been moved, the key 36, which had been operated, being held down until the plates have been moved back.

The products of the multiplicand multiplied by the various digits of the multiplier number are registered and added together as required in the wheels 111, constructed as ordinary total-wheels, mounted on a shaft 112, which is supported by the pivoted arms 113, Fig. 13, which allow the wheels to be moved to and from the sectors 72, the idle position being away from the sectors, so that the latter move backward, as described, without operating the wheels. A slide member 114 is connected to one of the arms 113 and extends vertically, being retained from lateral movement by pin-and-slot connection 115, Fig. 12. A pawl 116 is pivoted to the lower end of the member 114, the lower end of which can swing forward, but is prevented from backward turning by the pin 117 against the front side thereof and above the pivot. A lug 118 projects from the pawl 116 into the path of travel of the cam 58, which swings the pawl forward, when the cam travels forward. Ultimately the cam passes beyond the lug, and when returning to idle position the cam rubs under the lug and raises the member 114, and thereby the wheels 111, into mesh with the sectors 72, and this movement is timed so that the wheels and sectors are meshed before the latter are operated forward to register the result, as above described. Therefore the movement of the sectors registers the result of the multiplicand multiplied by the first digit in the multiplier number in the wheels 111, and in the problem being illustrated the first number registered is "1725," which is "345×5." While the sectors 72 are forward and before the arm 106 releases the slide 99 to permit backward operation of the sectors the cam 58 travels from under the lug 118 and the wheels 111 drop out of mesh with the sectors, and also the rod 67 releases the lever 78, and the posts 74 are moved back into position to receive the pins 73, so that the sectors will be stopped in perfect alinement. Just after the sectors are restored to idle position the bars 46 and the plates a b, &c., which had been moved thereby, are pushed back, the rod 67 moving the levers 65. The machine is now in position for the next operation, which is to multiply the number "345" by the next digit in the multiplier and add the result properly to the first result in the wheels 111, thus:

```
     3 4 5
      (1) 25
     ─────
     1725 ──already registered.
       10 ⎫
        8 ⎬──to be registered.
        6 ⎭
     ─────
     8625 ──result.
```

In order to place the results properly—i. e., the results of the different digits multiplied by "2"—in proper numerical alinement with the result "1725" already registered, the register-carriage 15 is moved leftward one space, thereby moving the numbers therein leftward, so that four bars 46 are controlled thereby and four of the plates $a$, $b$, or $c$, &c., are controlled by the bars. This leftward movement is permitted by operating the spacing-key 28, which releases the escapement 22, as described, and also operates the "0" rod 13, and thereby sets up the "0" stop in the fourth row of pins 34, and the number then registered therein is "3450," which, multiplied by "2," is equal to "345×20." The "0" rod 13 has a lug 119, Figs. 3 and 19, under which the lever 28 extends, so that the rod will be raised by operation of the lever. After the spacing-key has been so operated, the "2" key 36 is pushed down and held down, and all the plates $a$ $b$ $c$, &c., in each group are raised and released from the pins 50 except the plate $h$ in each group, denoting the multiplier "2." Then the handle 52 is operated as before and the moving bars 46 move an equal number of the plates $h$ forward coördinately. The sectors 72 are operated as before to receive the product, which is "3450 × 2," or "6900," which is registered in the product-wheels 111 and added to the number "1725," already therein, producing the result "8625," which is the product of "345×25." Then the spacing-key 28 is again operated to move the register-carriage 15 one more step leftward, just as before, registering therein "34500". The "1" key 36 is then held down, the unused plates released from the pins 50 (one plate $i$ in each group remaining in connection,) and the moving bars 46 move the plates $i$, denoting the multiplier "1," coördinately therewith. The sectors 72 then take up the result produced, which is "34500, which is "34500×1," said result then being registered in the wheels 111 and added to the result already therein, producing the result "43125," which is "345×125." The required processes of carrying are accomplished between the wheels 111 by coacting devices presently described. The construction of the plates $h$ and $i$ is shown in Figs. 28 and 29, respectively, and the stops on their upper and lower edges are arranged coördinately with the stops 34 in the carriage 15, so that the sectors 72 will be allowed backward movement to take up the tens of the product of the digits of the multiplicand multiplied by the plate-digit and forward movement to register the units of the products. Similarly and arbitrarily the other plates are formed with stops to subserve the same functions, and as the specific problem illustrated is sufficient to enable one to trace the operation in other instances no specific description of the other plates is necessary. It is to be noted, however, that the units-sector 72 never requires backward movement to take up tens, and hence a stationary stop 120, Fig. 29, engages the rear side of a pin 121 and always holds the sector from moving backward.

The necessary carrying from lower to higher orders in the addition is accomplished by special devices. The shaft 75 supports pivotally a series of arms 121$^a$, Figs. 16, 20, and 21, one for each wheel 111, except the one in the highest order from which nothing is carried, said arms being actuated upward by springs 122. An escapement member 123 is suspended from each arm and is actuated rearwardly by a spring 124. Alined openings 125 are formed in the members 123, and two teeth 126 are formed on the front edge of each opening. A bar 127 is supported by the framework and extends crosswise through the openings 125 and is provided with a projection which engages the teeth 126, so that the different members 123 will be held in the required positions. The idle position is that wherein the upper teeth 126 are engaged under the edge of the bar 127, thereby holding the arms 121$^a$ down in opposition to their springs 122. Pawls 128, Figs. 16 and 17, are paired with the controlling members 123 and are provided with openings registering with the openings 125 and are held against movement by the bar 127. A pin 129 projects leftward from each pawl.

A shaft 130, Figs. 13 and 21, forms a pivot and guide for the carrying-racks 131, which have slots 132, forming bearings, so that the racks may be moved forward and backward. Frame members 133 are attached to the shaft 130, and the front ends thereof are connected by a shaft 134, upon which the front ends of the racks 131 are slidingly supported through the medium of slots 135 of equal length with the slots 132. In idle position the wheels 111 are meshed with the racks 131, which are normally forward as far as they can be moved and which have two shoulders 136 on their front ends adjacent to the pawls 128, the said shoulders corresponding in length with the teeth of the rack. The pin 129 on each pawl normally engages behind the lower shoulder on the corresponding rack, and thereby the racks are held forward in opposition to their springs 137, which tend to draw the racks rearward. A shaft 138 is supported between the wheels 111 and the escapement-member 123, and pawl-levers 139 are mounted thereon, there being one such lever for each member 123, and the lower ends of said levers bear against the edges of said members 123. The rear ends of the pawl-levers 139 are alongside of the teeth of the wheels 111, and the "0" tooth of each wheel has a lateral lug 140, Figs. 16 and 20, which in idle position bear against the ends of the levers 139, and thereby prevent backward rotation of the wheels. In a well-understood manner each wheel, when a complete rotation is made, operates its pawl-lever 139, which pushes forward the member 123, controlling the rack 130 of the next higher order, so that the upper tooth 126 is released from the bar 127, and the spring 122 then draws the member 123 and the pawl 128 upward. The lever 139 is released by the tooth 140 in time for the member 123 to be snapped back by its spring 124 to engage the next lower tooth 126 with the bar 127. This raises the pin 129 above the lower shoulder 136 in line with the second shoulder, so that when the wheels 111 are again lowered into mesh with the racks 131 the racks so released will be drawn one tooth rearward, and thereby operate a distance of one tooth the corresponding wheels 111. A rod 141 above the racks 131 carries a series of pawls 142, and the frame-pieces 113, which support the wheel-shaft 112, carry a rod 143, Figs. 13 and 20, which when the machine is idle depresses the front ends of the pawls 142. A projection 144 is rigid with each rack 131, and when the wheels 111 are raised into mesh with the sectors 72 the rod 143 releases the pawls 142, which then engage with the projections 144, and thereby hold the racks from moving rearward when released from the pins 139 until the wheels 111 are lowered. When the wheels are lowered, the pawls 142 are released from the projections 144, and the racks which had been released from the pins 139 then move rearward and complete the carrying. Shoulders 136 are arranged to permit two successive operations of each rack in carrying, so that "2" may be carried from each order to the next higher, and there is no requirement for more, because any combination of results can be successfully added by this construction.

The next operation is to record the product or result on the platen. A rod 145 is mounted longitudinally near the base and is pivoted to a cross-lever 146, the opposite end of which has a pin operating in a slot 147 in the slide-rack 27, so that a forward pull of the said rod will push the rack 27 rearward, and thereby restore the register-carriage 15 to its idle position. A crank-lever 148, Figs. 3 and 4, has one arm pivoted to the rod 145 and the other arm to a link 149, the upper end of which is connected to the rod 134, supporting the racks 131. Said rod is movable vertically, and hence forward pull of the rod 145 lowers the front ends of the racks 131, carrying said racks downward out of mesh with the wheels 111 in opposition to the upholding-springs 150. The wheels 111 also lower until stopped by rack-teeth on the bars 46, said wheels and teeth meshing. The rear end of the rod 145 is wedge-shaped, Fig. 12, and underlies a vertically-movable member 151, similar to the members 39 and having a horizontal arm 152 on its upper end, said arm projecting under all the plates *a b c*, &c. When the rod 145 is drawn forward, the wedge on its rear end raises the member 151, and the arm 152 thereon lifts all the plates *a b c*, &c., from the pins 50, disconnecting all of the plates from the bars 46. A rod 153, Figs. 14, 16, and 21, extends crosswise behind the slides 79 and carries a plate 154 for each slide. A crank 155 is on one end of the rod and rests upon one of the frame members 113 and holds the plate 154 away from the slides 79 in opposition to a spring 157 to permit free movement of the slides until the product is to be printed. A projection 156 is on each slide, and the wheels 111 are lowered as described. The rod 153 is turned by its spring 157, thereby engaging the plate 154 under the projections 156 to uphold the slides 79 and lock the sectors 72 when the bars 46 move forward. When lever 146 is operated, an arm 159 thereon pushes toward the right a sleeve 160, Figs. 3, 12, and 19, on the shaft 59 in opposition to a spring 161. A cam 162 is rigid with the sleeve 160 and is moved behind a pin 163 on a lever 164, mounted on the shaft 55 and which controls the printing-hammers.

A shaft 165, Figs. 4 and 8, suitably positioned, supports the printing-hammers 166, held down by the pawls 167, engaging the pins 168. The front end of the lever 164 connects with a link 169, the upper end of which is pivoted to one of two arms 170 on a shaft 171. For each hammer 166 an arm 172 is mounted on the shaft 171, each arm having on its free end a lug 173, which bears upon the projecting arms of the hammers, said arms being connected by springs 174 with a rod 175, carried by extensions of the arms 170. A rod 176 is carried by the arms 170 and extends crosswise under the projecting ends of the hammers 166. A series of pawls 177 is mounted upon a rod 178 under the bars 46 and have on one end pins 179, against which the shoulders 180 on the bars 46 operate when the bars move forward, and thereby move the pawls. The opposite ends of the pawls engage with pins 181 on the arms 172, and thereby uphold said arms when the bars 46, corresponding thereto, have not been moved.

k. After operation of the rod 145 and the parts controlled thereby, as above described, the handle 52 is drawn forward, and the bars 46 are drawn forward by their levers 65 until stopped by the lugs 140 on the wheels 111 striking the ends of the pawls 139, and the number or product in the wheels 111 is then registered by the type 48 under the platen. The forward movement of the bars 46 releases the pawls 177 from the pins 181, and the lever 162 operates the lever 164, and thereby the link 169, which draws the rod 176 down and eventually releases the pawls 167 from the pins 168; but the bars 46, which do not move to record, do not release the pawls 177 thereunder. As soon as the pawls 167 and 177 have been released the hammers controlled thereby are thrown against the lower ends of the type and drive the same against the platen. Backward movement of the rod 176 restores the hammers and the arms 173 to their idle locked position, as shown.

The pawls 177 of the lower orders when their bars 46 do not move, as when "0" is to be recorded thereby, are operated by the pawls of the higher orders, which are operated by the latter bearing down upon tongues 182, rigid with the pawls and arranged and operated in a well-understood way.

The platen is drawn back as required to be printed on by the type by a lever 183 on a pivot 184, said lever being connected with the platen-frame and operated by a shoulder 185 on the link 169 engaging a lug 186 on the lower end of the lever during descent of the said link 169, Figs. 2 and 4.

The carrying-racks 131 have projections 187 on their under edges and are restored to idle position at each operation of the handle 52 by a rod 188, Fig. 21, connected by links 189 with the levers 62 and operating in elongated slots in the bars 46 above the register-carriage 15, the said rod being drawn against the projections 187, and thereby moving the racks 131 forward. The arms 121 extend beyond the shaft 75, Figs. 13 and 16, and a cross-rod 190, carried by two arms 191 on a rock-shaft 192, extends under the free ends of the arms. A crank-arm 193 is rigid with the shaft 192 and supports a link 194, on the lower end of which is a hook 195 in the path of travel of the rod 67, so that said rod, when the handle 52 is operated, will pull the link 194 down, and thereby rock the shaft 192 and raise the rod 190, which operates the arms 121, and thereby restores the carrying devices 123 to their idle position, so that the upper teeth 126 will engage the bar 127 and the pins 129 will engage the lower shoulders 136. Then when the handle 52 and the parts moved thereby return to idle position the machine is clear and ready to receive and multiply other numbers in the manner described and illustrated by the problem herein carried out.

I claim—

1. The combination of a movable carriage, parts adjustable therein to represent numbers, devices embodying a mechanical representation of the products of the digits multiplied by themselves and by each other, bars for controlling said devices, means for moving said bars against the parts adjusted to represent numbers in the carriage, wheels, and mechanism operable to translate the products represented by certain of the devices controlled by said bars into the wheels when the bars are so moved.

2. In a machine of the character described, a movable carriage, means to represent numbers therein, a series of movable bars, keys for operation after the number has been represented in the carriage, and devices controlled by the keys and operable in connection with the bars to register the products.

3. In a machine of the character described, a movable carriage, stops in said carriage, keys for positioning said stops and for moving said carriage laterally, multiplying devices including elements movable in one direction to obtain the tens partial product, and in the opposite direction to obtain the units partial product, and means for adding said partial products together; substantially as described.

4. In a machine of the class mentioned the combination with type-writing mechanism employing a platen, of a multiplicand-register, a movable bar for each digit registered, keys representing digits, a product-registering device operable in connection with the bars to register the product of the multiplicand multiplied by the digit of the key operated, and means for printing the product.

5. In a machine of the character described, keys and stops operable thereby to represent a number, traveling carriage in which said stops are arranged, in combination with keys separate from the first-mentioned keys, multiplying devices corresponding to the last-mentioned keys, said multiplying devices including elements movable in one direction to obtain the tens partial product, and in the opposite direction to obtain the units partial product, means for adding said partial products together and mechanism to operate the multiplying devices effectively to multiply any number represented by the said parts operated by the first-mentioned keys, by any number struck on the last-mentioned keys, substantially as specified.

6. The combination with the multiplicand-register, of a series of digit-keys, a series of independently-movable multiplying parts for each key, means for moving one of the independently-movable multiplying parts for each digit of the multiplicand after operation of one of the digit-keys to produce the product of the corresponding digits of the multiplicand multiplied by the digit of the key operated.

7. In a machine of the class mentioned, a multiplicand-register, keys denoting digits, a series of independently-movable multiplying devices arranged so that when operated after operation of one of said keys they will register the product of the multiplicand multiplied by the digit of the key operated, registering-wheels, and recording mechanism operable to print the product.

8. In a machine of the class mentioned, a multiplicand-register, keys denoting digits, a series of multiplying parts for each key, means for operating the required multiplying parts after operation of its key to register the product of the multiplicand multiplied by the key-digit, mechanism operable to perform the required addition, and devices for recording the product.

9. In a multiplying-machine, a multiplicand-register, product-wheels, key-controlled multiplying mechanism communicating between the multiplicand-register and the product-wheels, means for operating the multiplying mechanism to register the partial products in the wheels, means for performing the required addition and means for recording the product.

10. In a machine of class mentioned, a register, digit-keys, multiplying devices, means for operating the multiplying devices corresponding to the digit of the key operated, means for registering the product of the key-digit times the number in the register, means for performing the latter operation to register all the partial products in order, means for adding the partial products together, and means for recording the product.

11. In a multiplying-machine the combination with a register-carriage, and a series of bars movable in connection with the carriage and whose movement is determined by the number registered, of multiplying devices comprising members movable with the bars, and registering devices operable in connection with the members to register the product as determined by the relation of all the parts mentioned after their operation.

12. In a multiplying-machine, the combination with a register-carriage, a series of bars, and devices for moving the carriage and bars relatively in order to determine the scope of movement of the bars by the number registered in the carriage, of keys, multiplying devices controlled thereby and operable in connection with the bars to multiply the number registered in the carriage by the digit of the key moved, register-wheels, and means for registering the product therein.

13. In a multiplying-machine the combination with a register-carriage, means for registering numbers therein, bars, and devices for moving the bars coördinately with the number registered in the carriage, of keys denoting the digits of the multiplier, multiplying devices controlled by the keys, means for moving the required multiplying devices after operation of the required key, register-wheels for the product, gear attachments movable in two directions, movement in both directions being limited by the multiplying devices, and means for operating the register-wheels by the gear attachments to produce therein the product of the number registered in the carriage multiplied by the digit of the key operated, substantially as specified.

14. In a multiplying-machine, the combination with a register-carriage, and means for registering a number therein, of a member constructed to register by irregularities from the plane of its edges, the product of any digit in the number registered in the carriage multiplied by another digit, ten tens and units of the product being registered at different points on the same member, and means for operating said member as required to perform said function.

15. In a multiplying-machine the combination with a register-carriage and means for registering numbers therein, of members constructed to register by irregularities from the planes of their edges the products of the digits in the number registered in the carriage multiplied by another digit, means for operating said members to perform said functions, product-register wheels, and means for operating them for the purpose specified.

16. In a multiplying-machine, the combination with multiplying devices of product-register wheels, means for operating them to register the products therein, carrying devices operable in connection with the wheels, and means for operating said devices as required to carry a plurality of digits from the same orders, without completing a single process of carrying, substantially as specified.

17. In a machine of the class described, the combination of a register-carriage, means for registering numbers therein, wheels, bars and plates and gear attachments intermediate of the register-carriage and wheels, means for operating the bars, the plates and the gear attachments as required to multiply the number in the carriage, means for registering the product in the wheels, means for recording the product on a platen, and means for recording any desired words on the same platen whereon the products are recorded.

18. In a multiplying-machine, a carriage, means for registering numbers therein, digit-keys, digit-multiplying plates having irregularities on their edges arranged on a scale to indicate the digits of the products, wheels, and devices intermediate of the wheels and plates operable to register the given product in the wheels.

19. In a multiplying-machine, a register-carriage, means for registering numbers therein, a series of plates for each digit, said plates having irregularities on their edges arranged on a scale to indicate the digits in the results of multiplication of the number registered by the digit which the plate represents, wheels, means for registering the results in the wheels, means for adding different results, and means for recording the results.

20. In a machine of the character described, a traveling carriage parts therein adjustable to represent numbers, a series of multiplying devices, bars movable against the adjustable parts, wheels, and gear devices intermediate of the multiplying devices and the wheels for operating the latter to introduce products therein.

21. In a machine of the character described, a plate representing the product of a digit multiplied by itself and by the other digits, the units of the products being represented on one edge of the plate and the tens of the products being represented on the other edge.

22. In a machine of the character described, a plate for each digit, each plate representing the product of a digit multiplied by itself and by the other digits, means for adding together any desired combination of the products so represented and means to record the final product.

23. In a machine of the character described, a series of plates for each digit, each plate representing the product of a digit multiplied by itself and by the other digits and means for adding together any desired combinations of the products so represented.

24. In a machine of the character described, a series of plates representing the products of the digits multiplied by themselves and by the other digits, means for adding together any desired combination of the products so represented, and means to record the final product.

25. In a machine of the character described, a series of groups of multiplying devices, each group containing a mechanical representation of the products of the digits multiplied by themselves and by each other, a common actuating member for all the devices in each group, means for adjusting said devices to move them separately, and wheels to receive products when the multiplying devices are operated.

26. In a machine of the character described, a series of groups of multiplying devices, each group containing a mechanical representation of the digits multiplied by themselves and by each other, means for moving the multiplying devices in each group separately, wheels to receive products, and means for recording the products.

27. In a machine of the character described, a series of groups of devices, each group embodying a mechanical representation of the digits multiplied by themselves and by each other, a member for actuating all the devices of each group, means to control said devices to move them separately, wheels to receive products and recording mechanism to record the final products.

28. In a machine of the character described, a series of devices arranged mechanically to represent the products of digits multiplied by themselves and by each other, means to register products of numbers multiplied together, a platen, and means to record the products on the platen.

29. In a machine of the character described, a series of devices arranged to represent mechanically the products of the digits multiplied by themselves and by each other, means to register products of numbers multiplied together, a platen, and means to record the products on the platen, in combination with type-writing mechanism operable to record on the platen aforesaid.

30. In a machine of the character described, a series of groups of devices, each group containing a mechanical representation of the digits multiplied by themselves and by each other, means for moving the devices in each group separately, means to register products, a platen, and mechanism to record products on the platen, in combination with type-writing mechanism operable to record on the platen aforesaid.

31. In a machine of the character described, a series of multiplying-plates representing the products of digits multiplied by themselves and by each other, actuating devices, wheels to register the products, carrying mechanism associated with the wheels, and recording mechanism to record the products, substantially as specified.

32. In a machine of the character described, a series of multiplying-plates representing the products of the digits multiplied by themsleves and by each other, actuating devices, wheels to register the products, carrying mechanism associated with the wheels, a platen, means to record the products on the platen, and type-writing mechanism operable to print words and figures on said platen, substantially as described.

33. In a machine of the character described, a plurality of plates arranged to represent the products of the digits multiplied by themselves and by each other, wheels, actuating devices controlled by the plates to operate the wheels, and means to operate the plates as required to multiply numbers in the manner described in combination with mechanism operable to record the products of the numbers which were multiplied together.

34. In a machine of the character described, parts adjustable to represent numbers, plates arranged to represent mechanically the products of the digits multiplied by themselves and by each other, means for moving any desired plates coincidently with the parts adjusted to represent a number; means to register the products of the number represented by the adjusted parts multiplied by the digits of the plates moved, and means to add the partial products as produced in the process of multiplication.

35. In a machine of the character described, parts adjustable to represent numbers, plates embodying a mechanical representation of the digits multiplied by themselves and by each other, wheels, means for moving the plates coördinately with the adjusted parts and effectively to multiply the number represented thereby by another number or by itself, means to register the product in the wheels, and means to record the product.

36. In a machine of the character described, parts adjustable to represent numbers, plates embodying a mechanical representation of the products of the digits multiplied by themselves and by each other, wheels, means for moving the plates coördinately with the adjusted parts effectively to multiply the number represented thereby by another number or by itself, means to register the product in the wheels, a platen, mechanism to record the product on the platen, and type-writing mechanism operable to print words and figures on the said platen.

37. In a machine of the character described, a series of keys, parts adjustable by the keys to represent numbers, a series of key-controlled parts embodying a mechanical representation of the digits multiplied by themselves and by each other, means for moving said key-controlled parts effectively to multiply the number represented by the adjusted parts by another number or by itself, and means to record the product, substantially as specified.

38. In a machine of the character described, a series of keys, parts adjustable by the keys to represent numbers, a series of key-controlled plates embodying a mechanical representation of the digits multiplied by themselves and by each other, means for moving the key-controlled plates effectively to multiply the number represented by the adjusted parts by another number or by itself, a platen, means for recording the product on the platen, and type-writing mechanism operable to print on said platen.

39. In a machine of the character described, a series of wheels, parts adjustable to represent numbers, mechanism intermediate of the said parts and wheels operable effectively to multiply the number represented by the adjusted parts by another number or by itself, means to register the product in the wheels and means to record the product, substantially as specified.

40. In a machine of the character described, a series of wheels, parts adjustable to represent numbers, mechanism operable effectively to multiply the number represented by the adjusted parts by another number or by itself, means to register the product in the wheels, a platen, mechanism to record the product on the said platen, and type-writing mechanism operable to record words and figures on the said platen.

41. In a machine of the character described, a series of multiplying parts containing a mechanical representation of the products of the digits multiplied by themselves and by each other, wheels, mechanism operable in connection with the multiplying parts and the wheels to introduce the products into the latter, and means to record the products, substantially as described.

42. In a machine of the character described, a series of multiplying parts containing a mechanical representation of the digits multiplied by themselves and by each other, mechanism operable in connection therewith to carry to higher orders, and wheels controlled by said mechanism to receive the products.

43. In a machine of the character described, a series of multiplying parts, mechanism operable in connection therewith to carry to higher orders, wheels to receive the products and carrying mechanism associated with the wheels.

44. In a machine of the character described, a series of multiplying parts, mechanism operable in connection therewith to carry to higher orders, wheels to receive the products, carrying mechanism associated with the wheels, and mechanism to record the products.

45. In a machine of the character described, multiplying parts containing a mechanical representation of the products of the digits multiplied by themselves and by each other, wheels, mechanism operable in connection with the multiplying parts to carry from lower to higher orders and to operate the wheels to introduce the products therein, and means to record the products, substantially as described.

46. In a machine of the character described, multiplying parts containing a mechanical representation of the products of the digits multiplied by themselves and by each other, mechanism operable in connection therewith to carry to higher orders, wheels operated by said mechanism to receive the products, carrying mechanism associated with the wheels, and means to record the products.

47. In a machine of the character described, the combination with word-printing mechanism having a platen arranged to hold paper, of wheels, number-representing parts, an operating-handle, mechanism controlled by the operating-handle to multiply the number represented by the number-representing parts by any other digit at each operation and to introduce the product into the wheels, and printing mechanism separate from the word-printing mechanism for recording the product on the platen aforesaid.

48. In a machine of the character described, the combination with word-printing mechanism having a platen arranged to hold paper, of wheels, number-representing parts, an operating-handle, mechanism controlled by the operating-handle to multiply the number represented by the number-representing parts by any other digit and to introduce and add together the tens and units partial products in the wheels, and printing mechanism separate from the word-printing mechanism for recording the product on the platen aforesaid.

49. In a machine of the character described, multiplying parts containing a mechanical representation of the products of the digits multiplied by themselves and by each other, wheels, actuating devices for the wheels and mechanism for operating the multiplying parts and actuating devices as required to introduce products into the wheels, a platen, printing-type which are positioned by the multiplying parts and means to record the products represented in the wheels on the said platen.

50. In a machine of the character described, multiplying parts containing a mechanical representation of the products of the digits multiplied by themselves and by each other, wheels, actuating devices for the wheels, and mechanism for operating the multiplying parts and actuating devices as required to introduce products into the wheels, a platen, and means to record the products represented in the wheels on the said platen in combination with word-printing mechanism operable to print any desired word on the platen aforesaid.

51. In a machine of the character described, multiplying parts containing a mechanical representation of the products of the digits multiplied by themselves and by each other, wheels, actuating devices for the wheels, and mechanism for operating the multiplying parts and actuating devices as required to introduce products into the wheels, a platen, and means to record the products represented in the wheels on the said platen in combination with word-printing mechanism operable to print any desired word on the platen aforesaid in alinement with the products recorded thereon.

52. In a machine of the character described, a series of parts representing the products of the digits multiplied by themselves and by each other, an operating-handle, means controlled by the handle to adjust the said parts to represent the product of any desired number multiplied by any desired digit, a platen, and mechanism operable to record the product on the platen, and mechanism operable to print any desired words on the said platen.

53. In a machine of the character described, a series of parts representing the products of the digits multiplied by themselves and by each other. an operating-handle, means controlled by the handle to adjust the said parts to represent the product of any desired number multiplied by any desired digit, a platen, mechanism operable to record the product on the platen, and mechanism operable to print any desired words on said platen in alinement with the product-record.

54. In a machine of the character described, the combination with means for setting up numbers to be multiplied, and multiplying devices including elements movable in one direction to obtain the tens partial product and in the opposite direction to obtain the units partial product; substantially as described.

55. In a machine of the character described, the combination with means for setting up numbers to be multiplied, and multiplying devices including elements movable in one direction to obtain the tens partial product and in the opposite direction to obtain the units partial product, and a register for adding the partial products together; substantially as described.

56. In a machine of the character described, the combination with a group of multiplying-plates, each plate having complementary shoulders for determining the tens and units partial products, and digit-keys for selecting a particular plate; substantially as described.

57. In a machine of the character described, the combination with a group of multiplying-plates, each plate having complementary shoulders for determining the tens and units partial products, a rocking element for coöperating with said complementary shoulders, and digit-keys for selecting the plate; substantially as described.

58. In a machine of the character described, the combination with a group of multiplying-plates having complementary shoulders for determining the tens and units partial products, and independently-movable parts, one coöperating with the tens partial-product shoulders and the other with the units partial-product shoulders; substantially as described.

59. In a machine of the character described, the combination with multiplying-plates provided with complementary shoulders for determining tens and units partial products, a part movable in one direction to coöperate with the tens partial-product shoulders, another independently-movable part coöperating with the units partial-product shoulders, and means for registering and adding together the partial products obtained by said two moving parts; substantially as described.

60. In a machine of the character described, the combination with a group of movable gears each having projections extending in opposite directions, multiplying-plates having complementary shoulders for determining the tens and units partial products, means for positioning said multiplying-plates, and means for moving said gears first in one direction so that one projection will coöperate with a tens partial-product shoulder, and then in the opposite direction so that the projection on the adjacent gear will coöperate with the units partial-product shoulder; substantially as described.

61. In a machine of the character described, the combination with a plurality of gears having lateral projections extending from each side thereof, a group of multiplying-plates adjacent each gear, the plates in some of said groups coöperating with lateral projections of two adjacent gears, means for positioning said plates, and means for moving said gears; substantially as described.

62. In a machine of the character described, the combination with a group of multiplying-plates each having complementary shoulders identified with the tens and units partial products of the several digits multiplied by themselves and by each other, digit-keys, and connections between said keys and said plates whereby when any digit-key is operated a particular multiplying-plate is positioned thereby; substantially as described.

63. In a machine of the character described, the combination with multiplying-plates having complementary shoulders identified with tens and units partial products, there being a group of such plates for each denomination, denominational gears coöperating with said groups of plates, means for preventing movement of the units-gear when the tens partial product is being obtained, the tens, hundreds, thousands, &c. gears being provided with lateral projections coöperating with the plates of two groups; substantially as described.

64. In a machine of the character described, the combination with multiplying-plates and means for positioning them, of gears identified with different denominations arranged on each side of said plates and provided with projections extending in opposite directions, whereby when said gears are moved in one direction the projection on one of them will coöperate with said plate, and when said gears are moved in the opposite direction the projection on the other of said gears will coöperate with said plate; substantially as described.

65. In a machine of the character described, the combination with multiplying-plates and means for positioning said plates, of gears identified with different denominations and arranged on each side of said positioned plates, means for controlling the movements of said gears, and means whereby one of said gears is released to move in one direction while the other gear remains stationary, and means whereby said other gear may be moved in the opposite direction when the first-mentioned gear is held stationary; substantially as described.

66. In a machine of the character described, the combination with a shiftable paper-carriage, printing-type normally out of printing-line, and means for shifting said carriage in printing position over said type, and printing-hammers which are controlled by said means; substantially as described.

67. In a machine of the character described, the combination with register-wheels, printing-type whose position is controlled by said register-wheels, a paper-carriage, and means for shifting said paper-carriage to printing position over said type previous to taking a printing-impression from said type; substantially as described.

68. In a machine of the character described, the combination with multiplying devices, including shouldered plates for determining the tens and units partial products, means for adding said partial products together, printing-type for recording the product determined by said multiplying devices, a paper-carriage, and means for shifting said paper-carriage over said printing-type previous to making a printing impression of said product; substantially as described.

In testimony whereof I hereto affix my signature in the presence of two witnesses.

WILLIAM W. HOPKINS. [L. S.]

Witnesses:
FRED ARMSTRONG, Jr.,
FRANK J. McCASLIN.